(12) United States Patent
Singh

(10) Patent No.: US 12,608,121 B2
(45) Date of Patent: Apr. 21, 2026

(54) CONTEXT-BASED PRESENTATION OF AVAILABLE MICROAPP ACTIONS

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 382 days.

(21) Appl. No.: 17/359,793

(22) Filed: Jun. 28, 2021

(65) Prior Publication Data

US 2022/0413689 A1 Dec. 29, 2022

(51) Int. Cl.
| | |
|---|---|
| *G06F 3/04842* | (2022.01) |
| *G06F 3/04817* | (2022.01) |
| *G06F 9/54* | (2006.01) |
| *G06F 16/904* | (2019.01) |

(52) U.S. Cl.
CPC ...... *G06F 3/04842* (2013.01); *G06F 3/04817* (2013.01); *G06F 9/547* (2013.01); *G06F 16/904* (2019.01)

(58) Field of Classification Search
CPC .. G06F 3/04842; G06F 3/04817; G06F 9/547; G06F 16/904; G06F 2209/545; G06F 9/542; G06F 16/9038
See application file for complete search history.

(56) References Cited

U.S. PATENT DOCUMENTS

| | | | | |
|---|---|---|---|---|
| 9,582,482 | B1 * | 2/2017 | Sharifi | ............... G06F 3/04845 |
| 10,430,025 | B2 * | 10/2019 | Jones-McFadden | .... H04L 63/08 |

| | | | | |
|---|---|---|---|---|
| 10,565,527 | B2 * | 2/2020 | Silvestri | ............... H04W 4/029 |
| 10,671,245 | B2 * | 6/2020 | Alphin, III | .......... G06F 16/2228 |
| 10,839,325 | B2 * | 11/2020 | Fowler | ................. G06Q 10/109 |
| 10,942,980 | B2 * | 3/2021 | Haze | ...................... G06Q 30/02 |
| 10,970,646 | B2 * | 4/2021 | Sharifi | .................... G06F 9/453 |
| 11,132,179 | B1 * | 9/2021 | Chu | ......................... G06F 8/77 |

(Continued)

FOREIGN PATENT DOCUMENTS

| | | | | | |
|---|---|---|---|---|---|
| CN | 107690620 | A | * | 2/2018 | ........ G06F 3/04817 |
| CN | 112099710 | A | * | 12/2020 | |

(Continued)

OTHER PUBLICATIONS

Vikram Mehta, What are Micro APPs, and why do we need them?, Sep. 15, 2020, retrieved from—https://www.linkedin.com/pulse/what-micro-apps-why-do-we-need-them-vikram-mehta, 6 pages (Year: 2020).*

(Continued)

*Primary Examiner* — Yongjia Pan

(57) ABSTRACT

One disclosed method involves receiving, by an application associated with a client device and from a computing system, a plurality of indicators of actions that the computing system is configured to take with respect to systems of record in response to user input to the client device; determining first data indicative of a state of the client device; selecting, by the application and based at least in part on the first data, a subset of the plurality of indicators; and causing the client device to present one or more selectable user interface elements corresponding to the selected subset of the plurality of indicators such that selection of the one or more selectable user interface elements enables the client device to cause the computing system to take the indicated actions with respect to the systems of record.

17 Claims, 17 Drawing Sheets

(56) References Cited

U.S. PATENT DOCUMENTS

| | | | | |
|---|---|---|---|---|
| 11,288,083 | B2 * | 3/2022 | Dobson | G06F 3/1454 |
| 2011/0016421 | A1 * | 1/2011 | Krupka | G06F 40/20 |
| | | | | 715/810 |
| 2012/0096435 | A1 * | 4/2012 | Manolescu | G06F 8/60 |
| | | | | 717/121 |
| 2012/0278209 | A1 * | 11/2012 | Tran | G06Q 30/04 |
| | | | | 705/30 |
| 2012/0278736 | A1 * | 11/2012 | Tran | H04W 4/029 |
| | | | | 715/753 |
| 2013/0073614 | A1 * | 3/2013 | Shine | G06F 8/20 |
| | | | | 709/203 |
| 2013/0179832 | A1 * | 7/2013 | Bhola | G06F 16/9535 |
| | | | | 715/764 |
| 2014/0053088 | A1 * | 2/2014 | Civelli | G06F 16/90335 |
| | | | | 715/760 |
| 2015/0248494 | A1 * | 9/2015 | Mital | G06F 16/24575 |
| | | | | 707/722 |
| 2015/0317559 | A1 * | 11/2015 | Cronin | G06F 3/0484 |
| | | | | 706/46 |
| 2017/0031575 | A1 * | 2/2017 | Dotan-Cohen | G06F 3/04842 |
| 2017/0097743 | A1 * | 4/2017 | Hameed | G06F 3/0484 |
| 2017/0215024 | A1 * | 7/2017 | Pang | H04L 67/34 |
| 2018/0129544 | A1 * | 5/2018 | Ekambaram | G06F 9/541 |
| 2018/0225594 | A1 * | 8/2018 | Silvestri | H04W 4/20 |
| 2019/0188013 | A1 * | 6/2019 | Krishna | G06N 5/04 |
| 2019/0220438 | A1 * | 7/2019 | Pal | G06F 9/453 |
| 2019/0265865 | A1 * | 8/2019 | Yaseen | G06Q 30/016 |
| 2019/0392345 | A1 * | 12/2019 | Adaska | G06N 5/04 |
| 2020/0020326 | A1 * | 1/2020 | Srinivasan | G06N 3/044 |
| 2020/0042295 | A1 * | 2/2020 | Straub | G06Q 30/016 |
| 2020/0125586 | A1 * | 4/2020 | Rezaeian | G06F 3/048 |
| 2020/0394057 | A1 * | 12/2020 | Dobson | G06F 3/1454 |
| 2021/0109607 | A1 * | 4/2021 | Stalzer | G06V 10/774 |
| 2021/0191790 | A1 | 6/2021 | Gogate et al. | |
| 2022/0043964 | A1 * | 2/2022 | Stenerson | G06N 20/00 |
| 2022/0067106 | A1 * | 3/2022 | Saez | G06F 9/5072 |
| 2022/0091905 | A1 * | 3/2022 | Lee | G06F 9/4806 |
| 2022/0245520 | A1 * | 8/2022 | Wantland | G06F 40/30 |
| 2022/0318039 | A1 * | 10/2022 | Krishna | G06N 5/04 |
| 2024/0046238 | A1 * | 2/2024 | Kumar | G06Q 20/29 |

FOREIGN PATENT DOCUMENTS

| | | | | | |
|---|---|---|---|---|---|
| CN | 109388303 | B | * | 9/2021 | G06F 3/04817 |
| CN | 114631078 | A | * | 6/2022 | G06F 21/41 |
| EP | 2424266 | A2 | * | 2/2012 | H04N 21/44224 |
| WO | WO-2019010328 | A1 | * | 1/2019 | G06F 3/04817 |
| WO | WO-2021051330 | A1 | * | 3/2021 | G06F 21/41 |

OTHER PUBLICATIONS

Micro-Webapps, Oct. 27, 2015, retrieved from—https://github.com/micro-webapps/micro-webapps, 5 pages (Year: 2015).*

SAP Mobile Cards—a microapp development platform for the Intelligent Enterprise, Feb. 9, 2019, retrieved from—https://community.sap.com/t5/technology-blogs-by-sap/sap-mobile-cards-a-microapp-development-platform-for-the-intelligent/ba-p/13417439, 5 pages (Year: 2019).*

Citrix Workspace, Jul. 13, 2020, retrieved from—https://www.igel.com/wp-content/uploads/2020/07/citrix-workspace.pdf, 86 pages (Year: 2020).*

How to add AppClip to Siri's Nearby Suggestions?, Jun. 24, 2020, retrieved from—https://stackoverflow.com/questions/62559071/how-to-add-appclip-to-siris-nearby-suggestions, 5 pages (Year: 2020).*

App Clips on IOS 14: How to Develop, Jun. 5, 2020, retrieved from—https://mac6classi.medium.com/app-clips-on-ios-67324f1dd15 , 9 pages (Year: 2020).*

Nish Tahir, James Sun, An introduction to Android Instant Apps, May 18, 2017, retrieved from—https://www.willowtreeapps.com/craft/an-introduction-to-android-instant-apps, 12 pages (Year: 2017).*

Julio Zynger, Extending the Web with Android Instant Apps, May 18, 2017, retrieved from—https://medium.com/@juliozynger/extending-the-web-with-android-instant-apps-bba10d910f0d, 12 pages (Year: 2017).*

International Search Report and Written Opinion issued Jul. 6, 2022 for International Patent Application No. PCT/US2022/026321.

Ruzi Ana; "Citrix Workspace Microapps Service", Mar. 6, 2020 (Mar. 6, 2020), XP055932915, Retrieved from the Internet:URL: http://web.archive.org/web/20200306132843/https://docs.citrix.com/en-us/tech-zone/learn/tech-briefs/workspace-microapps.html [retrieved on Jun. 20, 2022] the whole document.

* cited by examiner

140

142 — DETERMINE A PLURALITY OF INDICATORS OF ACTIONS THAT THE COMPUTING SYSTEM IS CONFIGURED TO TAKE WITH RESPECT TO SYSTEMS OF RECORD IN RESPONSE TO USER INPUT TO A CLIENT DEVICE

144 — DETERMINE THAT FIRST DATA IS ASSOCIATED A FIRST INDICATOR OF THE PLURALITY OF INDICATORS, THE FIRST INDICATOR CORRESPONDING TO A FIRST ACTION THAT THE COMPUTING SYSTEM IS CONFIGURED TO TAKE WITH RESPECT TO A FIRST SYSTEM OF RECORD

146 — DETERMINE SECOND DATA INDICATIVE OF A CONTEXTUAL STATE OF THE CLIENT DEVICE

148 — DETERMINE THAT THE SECOND DATA MATCHES THE FIRST DATA

150 — CAUSE, BASED AT LEAST IN PART ON THE SECOND DATA MATCHING THE FIRST DATA, THE CLIENT DEVICE TO PRESENT A FIRST SELECTABLE USER INTERFACE ELEMENT CORRESPONDING TO THE FIRST INDICATOR

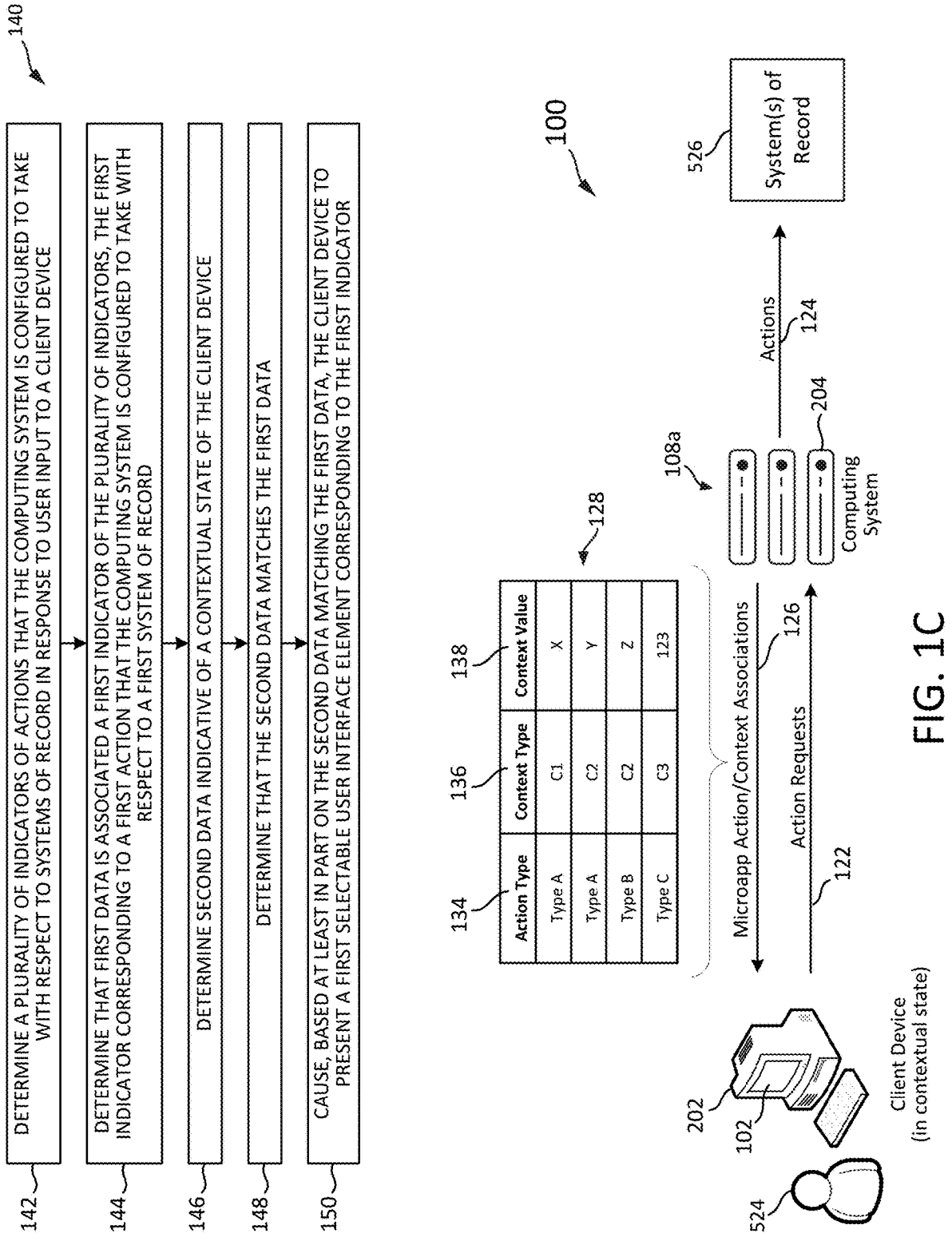

100

128

| Action Type | Context Type | Context Value |
|---|---|---|
| Type A | C1 | X |
| Type A | C2 | Y |
| Type B | C2 | Z |
| Type C | C3 | 123 |

134        136        138

Microapp Action/Context Associations    126

Action Requests

122

108a

Actions    124

204

Computing System

System(s) of Record    526

202

102

Client Device (in contextual state)

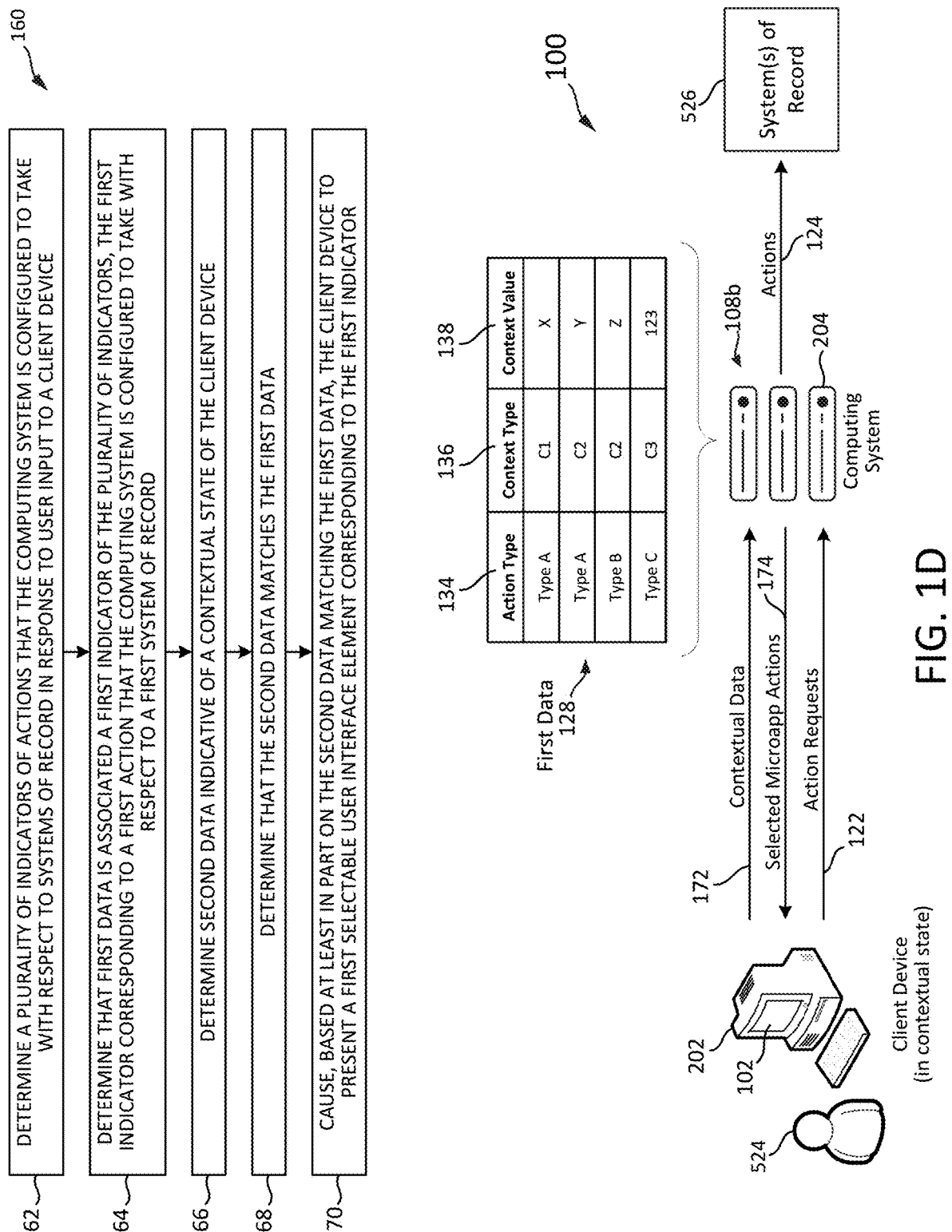

160

162 — DETERMINE A PLURALITY OF INDICATORS OF ACTIONS THAT THE COMPUTING SYSTEM IS CONFIGURED TO TAKE WITH RESPECT TO SYSTEMS OF RECORD IN RESPONSE TO USER INPUT TO A CLIENT DEVICE

164 — DETERMINE THAT FIRST DATA IS ASSOCIATED A FIRST INDICATOR OF THE PLURALITY OF INDICATORS, THE FIRST INDICATOR CORRESPONDING TO A FIRST ACTION THAT THE COMPUTING SYSTEM IS CONFIGURED TO TAKE WITH RESPECT TO A FIRST SYSTEM OF RECORD

166 — DETERMINE SECOND DATA INDICATIVE OF A CONTEXTUAL STATE OF THE CLIENT DEVICE

168 — DETERMINE THAT THE SECOND DATA MATCHES THE FIRST DATA

170 — CAUSE, BASED AT LEAST IN PART ON THE SECOND DATA MATCHING THE FIRST DATA, THE CLIENT DEVICE TO PRESENT A FIRST SELECTABLE USER INTERFACE ELEMENT CORRESPONDING TO THE FIRST INDICATOR

FIG. 1D

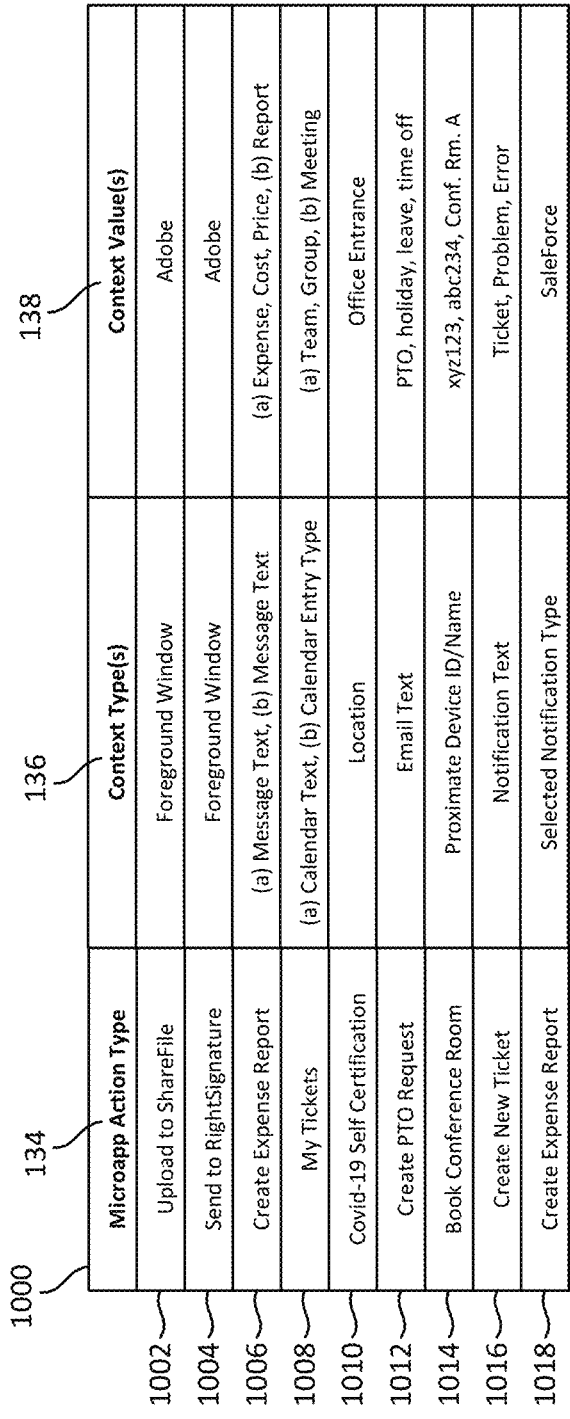

| Microapp Action Type | Context Type(s) | Context Value(s) |
|---|---|---|
| Upload to ShareFile | Foreground Window | Adobe |
| Send to RightSignature | Foreground Window | Adobe |
| Create Expense Report | (a) Message Text, (b) Message Text | (a) Expense, Cost, Price, (b) Report |
| My Tickets | (a) Calendar Text, (b) Calendar Entry Type | (a) Team, Group, (b) Meeting |
| Covid-19 Self Certification | Location | Office Entrance |
| Create PTO Request | Email Text | PTO, holiday, leave, time off |
| Book Conference Room | Proximate Device ID/Name | xyz123, abc234, Conf. Rm. A |
| Create New Ticket | Notification Text | Ticket, Problem, Error |
| Create Expense Report | Selected Notification Type | SaleForce |

CONTEXT-BASED PRESENTATION OF AVAILABLE MICROAPP ACTIONS

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves receiving, by an application associated with a client device and from a computing system, a plurality of indicators of actions that the computing system is configured to take with respect to systems of record in response to user input to the client device; determining first data indicative of a state of the client device; selecting, by the application and based at least in part on the first data, a subset of the plurality of indicators; and causing the client device to present one or more selectable user interface elements corresponding to the selected subset of the plurality of indicators such that selection of the one or more selectable user interface elements enables the client device to cause the computing system to take the indicated actions with respect to the systems of record.

In some disclosed embodiments, a system includes at least one processor, and at least one computer-readable medium encoded with instructions which, when executed by the at least one processor, cause the system to receive, by an application associated with a client device and from a computing system, a plurality of indicators of actions that the computing system is configured to take with respect to systems of record in response to user input to the client device, to determine first data indicative of a state of the client device, to select, by the application and based at least in part on the first data, a subset of the plurality of indicators, and to cause the client device to present one or more selectable user interface elements corresponding to the selected subset of the plurality of indicators such that selection of the one or more selectable user interface elements enables the client device to cause the computing system to take the indicated actions with respect to the systems of record.

In some disclosed embodiments, a method involves determining a plurality of indicators of actions that a computing system is configured to take with respect to systems of record in response to user input to a client device; determining that first data is associated a first indicator of the plurality of indicators, the first indicator corresponding to a first action that the computing system is configured to take with respect to a first system of record; determining second data indicative of a contextual state of the client device; determining that the second data matches the first data; and causing, based at least in part on the second data matching the first data, the client device to present a first selectable user interface element corresponding to the first indicator such that selection of the first selectable user interface element enables the client device to cause the computing system to take the first action with respect to the first system of record.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1C shows a second example implementation of a system for presenting available microapp actions based on contextual information in accordance with some aspects of the present disclosure;

FIG. 1D shows a third example implementation of a system for presenting available microapp actions based on contextual information in accordance with some aspects of the present disclosure;

FIG. 10 show an example table including examples of action/context mapping data that may be used to determine microapp actions to include on a list of available microapp actions based on a contextual state of a client device in accordance with some aspects of the present disclosure;

DETAILED DESCRIPTION

Figure 1A:
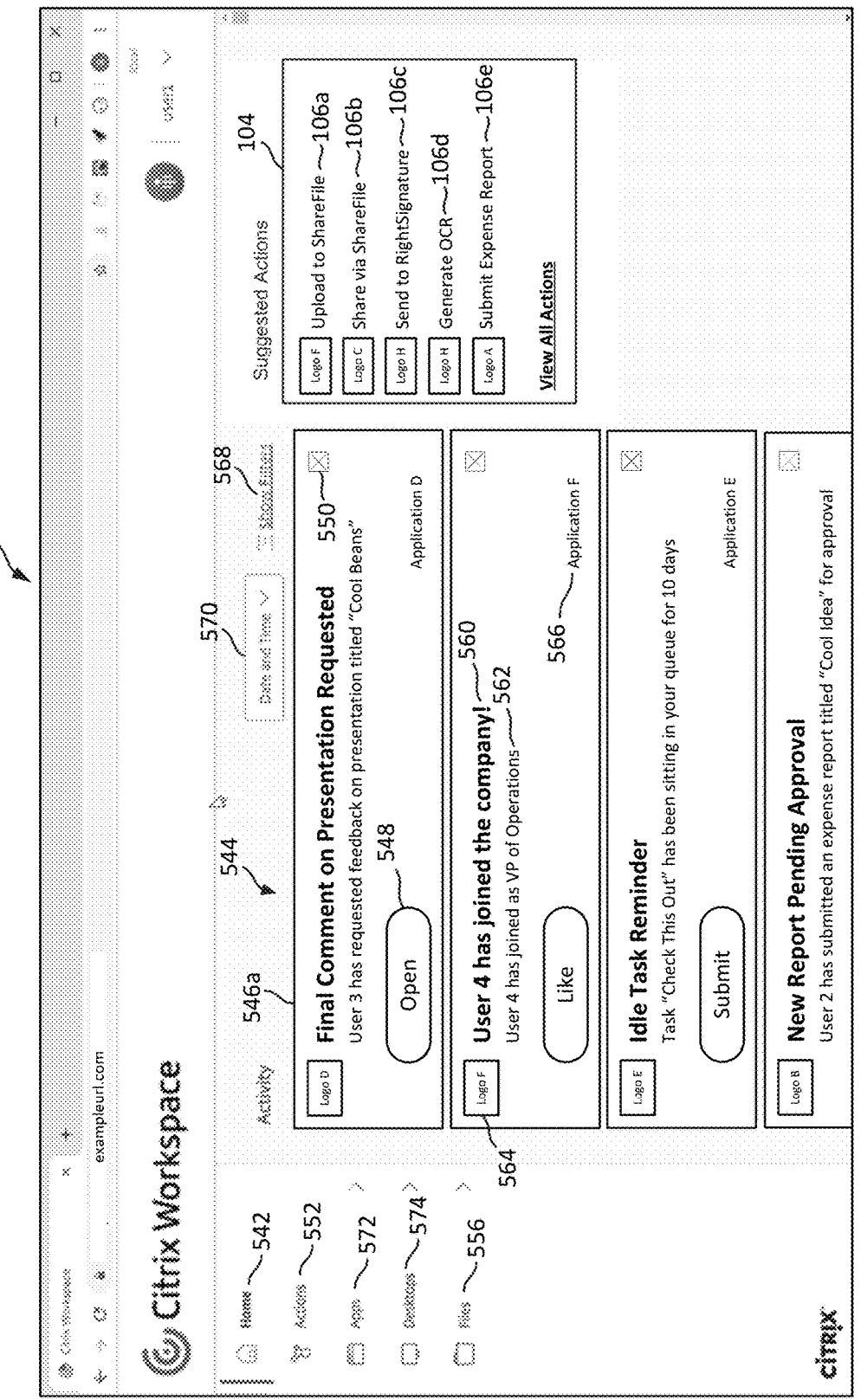
FIG. 1A shows an example display screen in which an actions list is presented in accordance with some aspects of the present disclosure.

For purposes of reading the description of the various embodiments below, the following descriptions of the sections of the specification and their respective contents may be helpful:

Section A provides an introduction to example embodiments of systems for presenting available microapp actions based on contextual information in accordance with some aspects of the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the systems for presenting available microapp actions based on contextual information that are introduced in Section A; and Section G describes example implementations of methods, systems/devices, and computer-readable media in accordance with the present disclosure.

A. Introduction to Illustrative Embodiments of Systems for Presenting Available Microapp Actions Based on Contextual Information An intelligent activity feed, such as that offered by the Citrix Workspace™ family of products, provides significant benefits, as it allows a user to respond to application-specific events generated by disparate systems of record, without requiring the user to switch context and separately launch the respective applications to take actions with respect to the different events. An example of a system capable of providing such an activity feed is described in Section E below in connection with FIGS. 5A-D. In such a system, a remote computing system may be responsible for monitoring and interacting with various systems of record (e.g., SaaS applications, web applications, Windows applications, Linux applications, desktops, file repositories and/or file sharing systems, etc.) on behalf of a user operating a client device. As Section E describes (in connection with FIGS. 5C and 5D), a user 524 may operate a client device 202 so as to interact with "microapps" corresponding to particular functionalities of a variety of systems of record 526, and such microapps may, in turn, interact with the systems of record 526, e.g., via application programming interfaces (APIs) of such systems, on behalf of the user 524.

More specifically, and as described in more detail in Section E, a microapp service 528 (shown in FIG. 5C) may periodically request a sync with a data integration provider service 530, so as to cause active data to be pulled from the systems of record 526. In some implementations, for example, the microapp service 528 may retrieve encrypted service account credentials for the systems of record 526 from a credential wallet service 532 and request a sync with the data integration provider service 530. The data integration provider service 530 may then decrypt the service account credentials and use those credentials to retrieve data from the systems of record 526. The data integration provider service 530 may then stream or otherwise provide the retrieved data to the microapp service 528. The microapp service 528 may store the received systems of record data in the active data cache service 534 and also send raw events to an analytics service 536 for processing. The analytics service 536 may create notifications (e.g., targeted scored notifications) and send such notifications to the notification service 538. The notification service 538 may store the notifications in a database to be later served in an activity feed and/or may send the notifications out immediately to the client 202 as a push notification to the user 524.

Figure 5A:
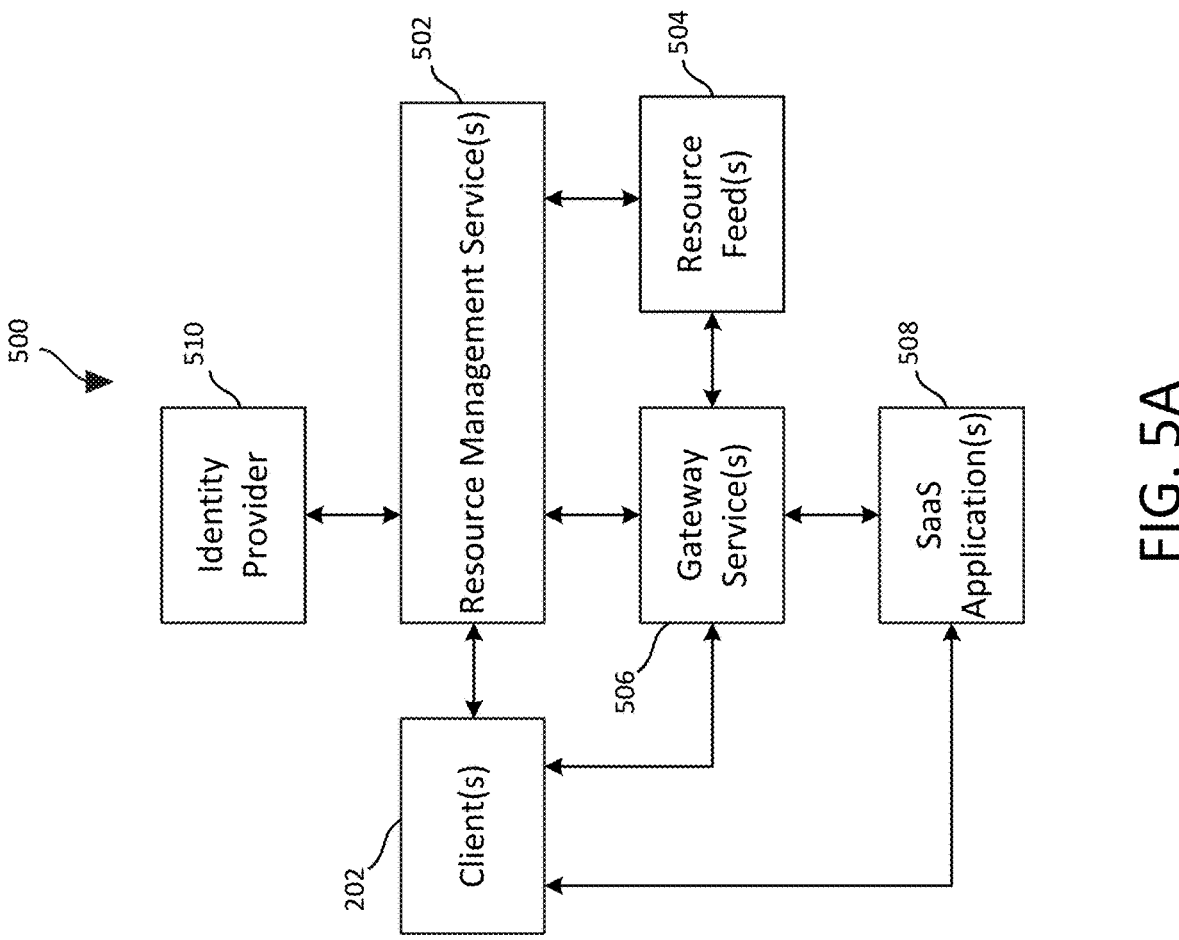
FIG. 5A is a block diagram of an example system in which resource management services may manage and streamline access by clients to resource feeds (via one or more gateway services) and/or software-as-a-service (SaaS) applications.
Figure 5B:
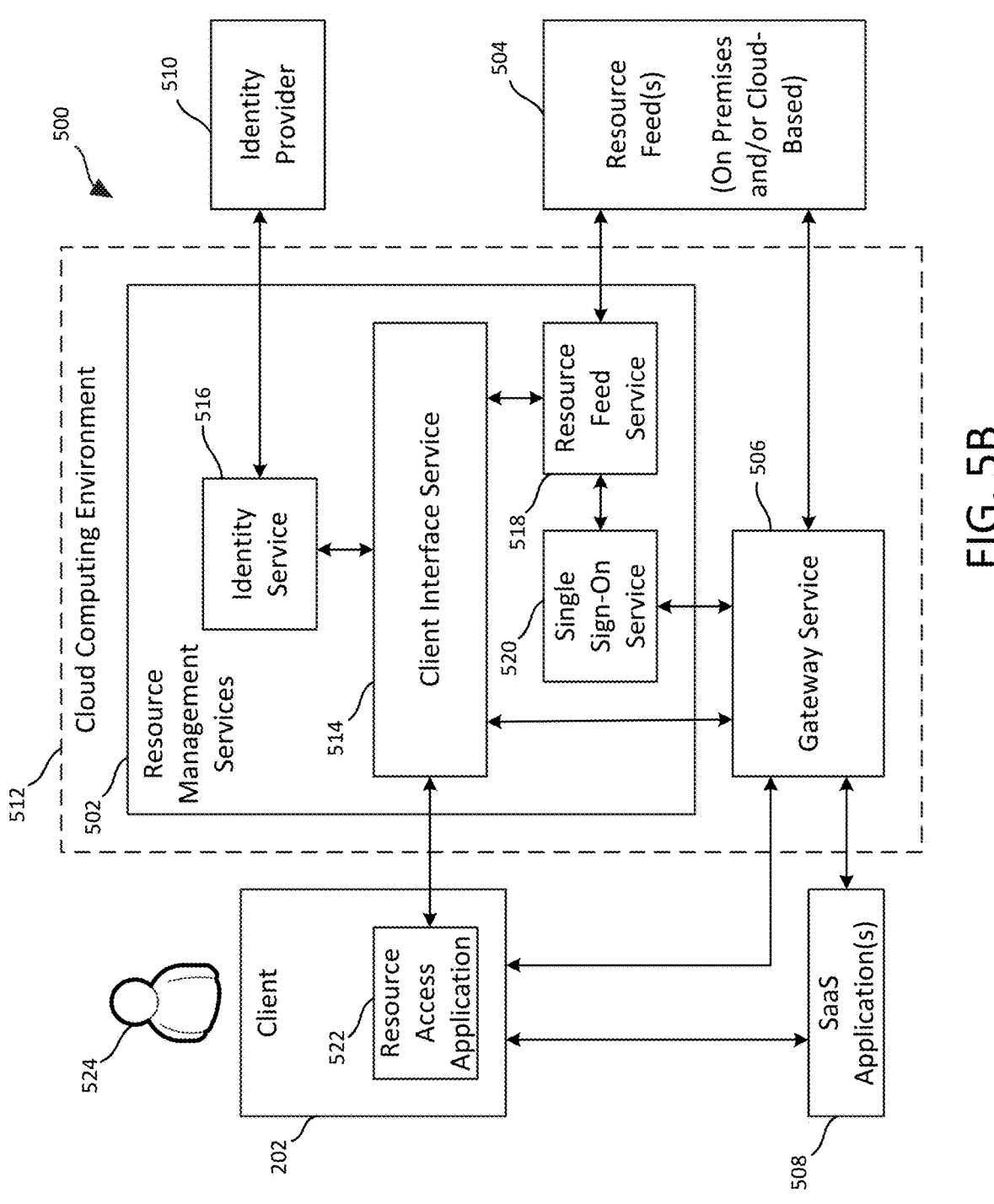
FIG. 5B is a block diagram showing an example implementation of the system shown in FIG. 5A in which various resource management services as well as a gateway service are located within a cloud computing environment.
Figure 5C:
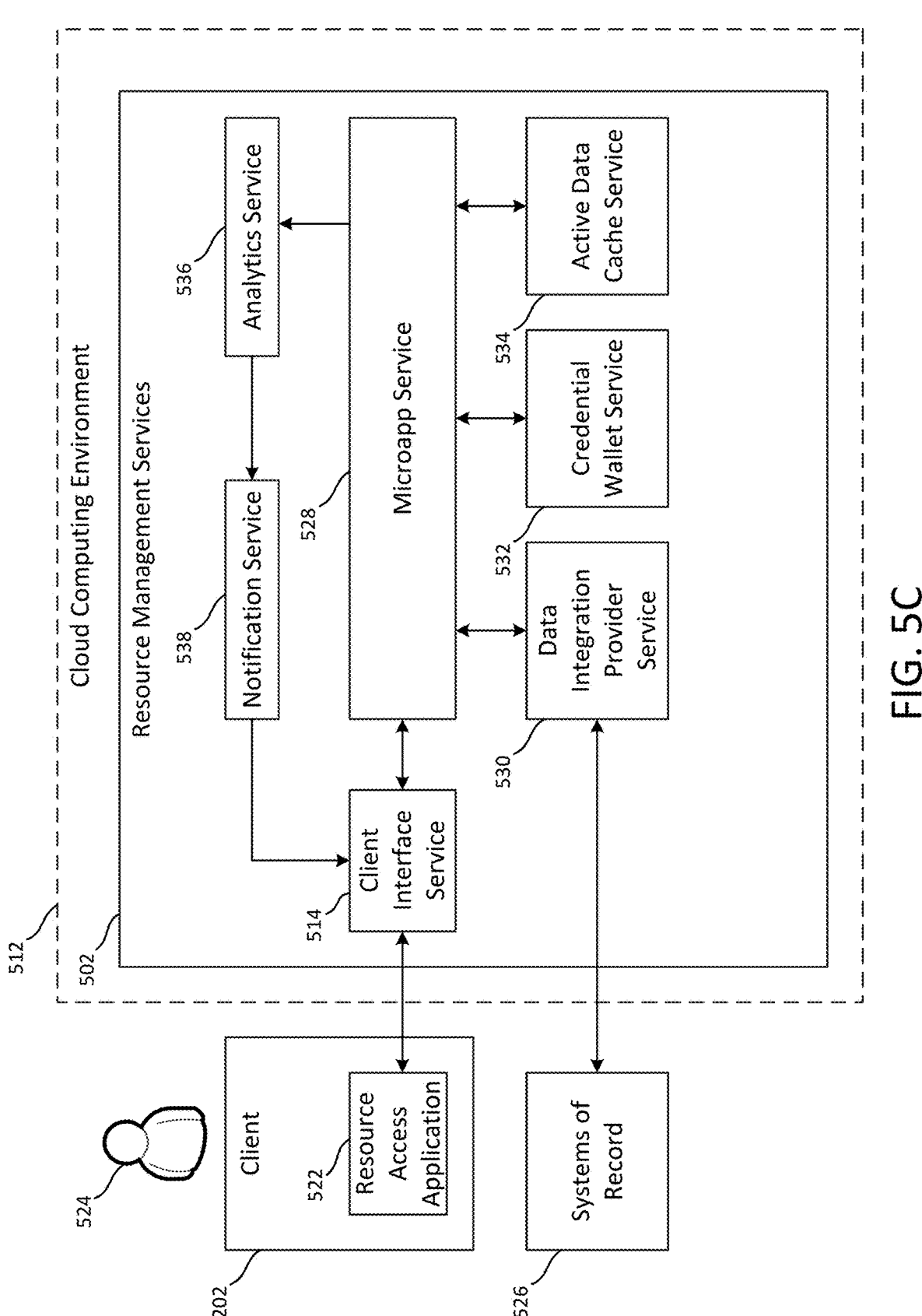
FIG. 5C is a block diagram similar to that shown in FIG. 5B but in which the available resources are represented by a single box labeled "systems of record," and further in which several different services are included among the resource management services.
Figure 5D:
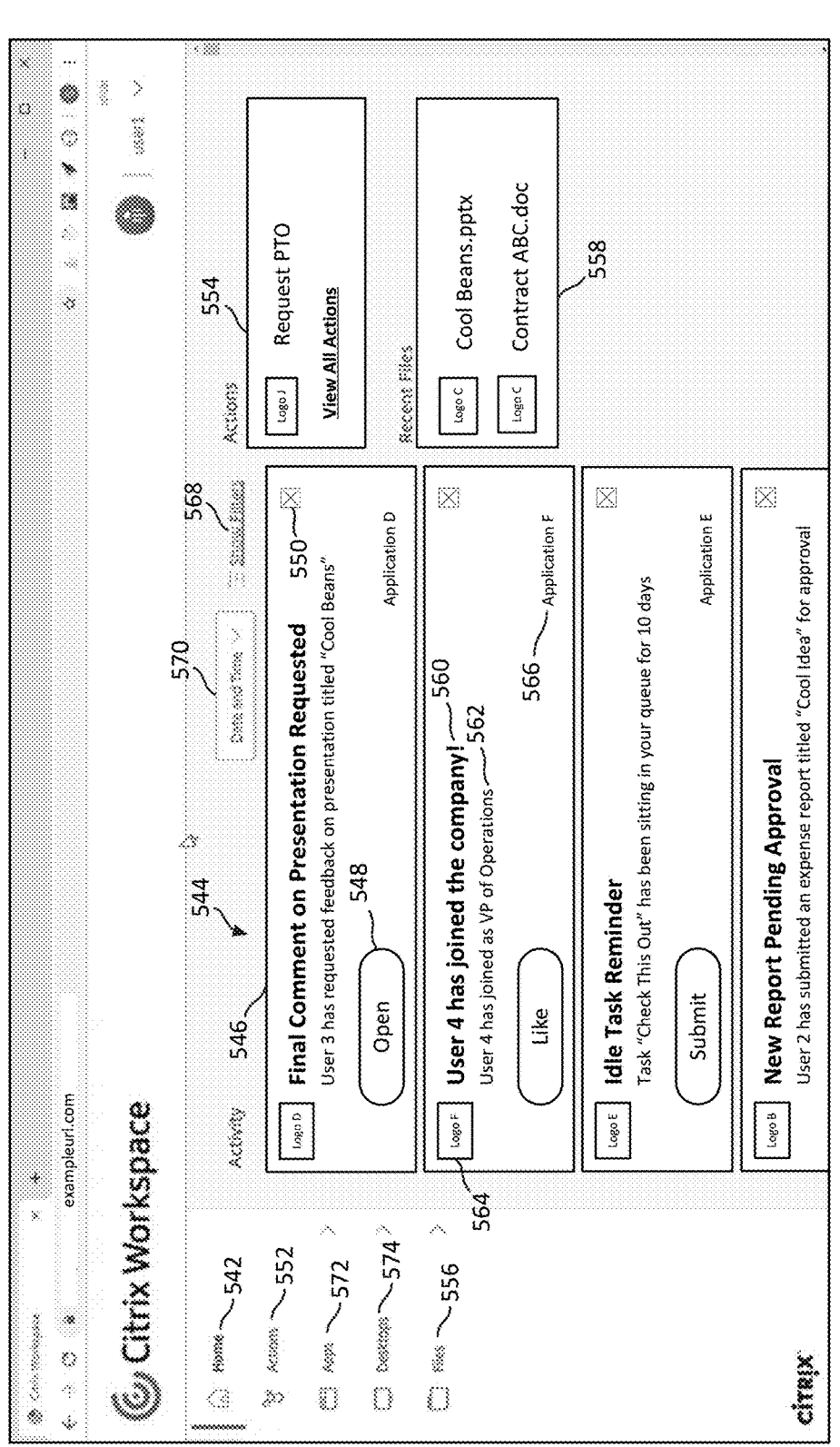
FIG. 5D shows how a display screen may appear when an intelligent activity feed feature of a multi-resource management system, such as that shown in FIG. 5C, is employed.

FIG. 5D, which is also described in more detail in Section E, shows how a display screen 540 presented by a resource access application 522 (shown in FIG. 5C) may appear when an intelligent activity feed feature is employed and a user 524 is logged on to the system. As shown in FIG. 5D, an activity feed 544 may be presented on the display screen 540 that includes a plurality of notifications 546 about respective events that occurred within various applications to which the user 524 has access rights. As described below (in connection with FIG. 5D), in some implementations, when presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550.

As explained in connection with FIG. 5C below, the notifications 546 and corresponding action elements 548 may be implemented, for example, using "microapps" that can read and/or write data to systems of record 526 using application programming interface (API) functions or the like, rather than by performing full launches of the applications for such systems of record 526. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification 546 via that native application rather than via the microapp.

In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of available microapp actions. In some implementations, the various microapp actions available to the user 524 logged onto the multi-resource access system 500 may be enumerated to the resource access application 522, e.g., when the user 524 initially accesses the system 500, and the list 554 may include a subset of those available microapp actions. The available microapp actions may, for example, be organized alphabetically based on the names assigned to the actions, and the list 554 may simply include the first several (e.g., the first four) microapp actions in the alphabetical order. In other implementations, the list 554 may alternatively include a subset of the available microapp actions that were most recently or most commonly accessed by the user 524, or that are preassigned by a system administrator or based on some other criteria.

The inventor has recognized and appreciated that, while it can be beneficial in many circumstances for a user to have ready access to such a list 554 of microapp actions, situations can arise in which a user might want to invoke a microapp action that is not on the list 554 as it is currently configured. In this regard, the inventor has also recognized and appreciated that the types of actions a user takes frequently depend, to at least some extent, on a current contextual state of the client device 202, such the type of application window (e.g., a Word window, an Excel window, an Adobe window, etc.) being presented by the client device 202, the content of a message, calendar entry, document, notification 546, etc., accessed by the client device 202, the type of notification 546 that is currently or was most-recently selected within the activity feed 544, the current location of the client device 202, the current time of day and/or day of the week, the presence of nearby devices (e.g., Internet of Things (IoT) devices), etc.

Figure 1B:
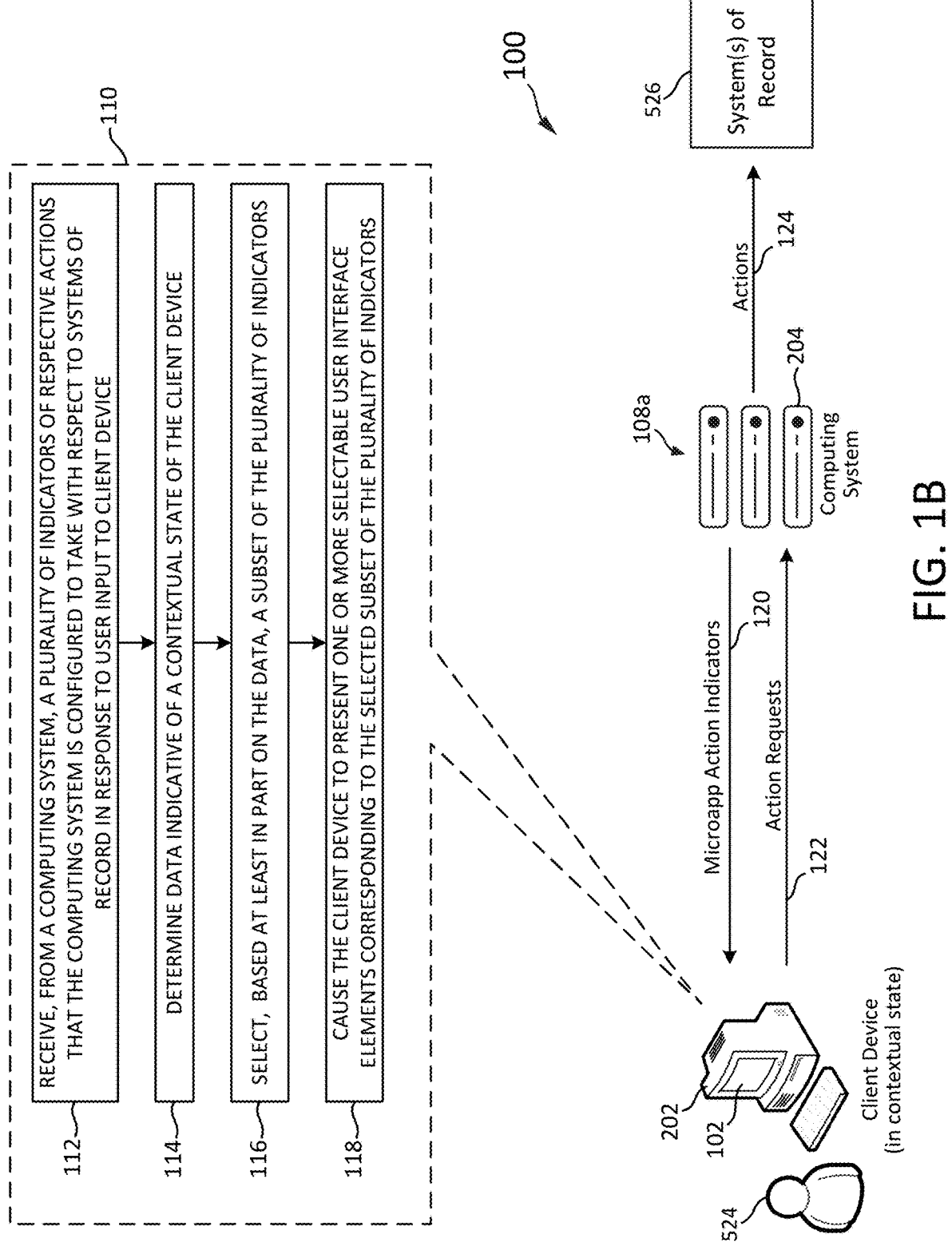
FIG. 1B shows a first example implementation of a system for presenting available microapp actions based on contextual information in accordance with some aspects of the present disclosure.

Offered is a system that can take the current contextual state of the client device 202 into account to determine one or more suggested actions to present to a user, e.g., via a list of microapp actions similar to the list 554 noted above, based on that contextual state. FIG. 1A shows an example display screen 102 that includes, on the right-hand side, an actions list 104 configured in accordance with some embodiments of the present disclosure. FIGS. 1B-D (described in more detail below) show example implementations of a system 100 that may enable a client device 202 to present the display screen 102 including the actions list 104. As one illustrative example, the actions list 104 (shown in FIG. 1A) may be presented on the client device 202 based on a determination that a window for Adobe Acrobat is currently active on the client device 202. As indicated, in such an example, based on the Adobe Acrobat window being active, one or more microapp actions that are likely to be invoked with respect to an Adobe file may be identified, and one or more user interface elements (e.g., links) 106a-106e for those microapp actions may be presented on the display screen 102. Although not shown in FIG. 1A, it should be appreciated that, in the event that the number of microapp actions that are identified exceeds a certain threshold, e.g., more than can fit in the available display space, the list of microapp actions may be presented as a scrollable list of selectable user interface elements and/or an additional user interface element may be presented, e.g., titled "more," and selection of such element may trigger presentation of a larger window including the entire group of identified microapp actions.

In some implementations, the client device 202 may be configured (e.g., via the resource access application 522 shown in FIGS. 5C and 5D) so that clicking on a respective one of the user interface elements 106a-106e may trigger the client device 202 to present a user interface for a corresponding microapp, thus allowing the user 524 to take the indicated action with respect to the indicated system of record. For example, clicking on the "upload to ShareFile" link 106a may trigger the client device 202 to present a user interface for a ShareFile® microapp, which user interface may include one or more action elements that the user 524 can select to initiate the upload of a file (e.g., an Adobe file open in the Adobe Acrobat window that triggered the presentation of the link 106a) to the ShareFile® system.

As shown in FIGS. 1B-D, in addition to the client device 202 (examples of which are described below in Sections B-D), the system 100 may include a computing system 108a, 108b and one or more systems of record 526 (examples of which are described below in Section E). As indicated, the computing system 108a, 108b may include one or more servers 204 (examples of which are described below in Sections B-D). In some implementations, the computing system 108a, 108b may be included within, or may operate in conjunction with, the resource management services 502 described below (in Section E) in connection with FIGS. 5C and 5D.

FIG. 1B shows a first example routine 110 that may be performed, at least in part, by an application associated with the client device 202 (e.g., the resource access application 522) of the system 100 to present the actions list 104 shown in FIG. 1A. As shown in FIG. 1B, at a step 112 of the routine 110, in some implementations, the application associated with the client device 202 may receive from the computing system 108a (e.g., as indicated by an arrow 120) a plurality of indicators of microapp actions that the computing system 108a is configured to perform with respect to the system(s) of record 526 in response to user input to the client device 202. For example, in some implementations, the resource management services 502 (shown in FIGS. 5C and 5D) may enumerate available microapp actions, along with other resources that are available to the client device 202, to the resource access application 522 after the user 524 successfully authenticates to the multi-resource access system 500.

At a step 114 of the routine 110, the application associated with the client device 202 may determine data indicative of a current contextual state of client device 202. The determined data may, for example, indicate (A) the type of application window (e.g., a Word window, an Excel window, an Adobe window, etc.) being presented by the client device 202, (B) the content of a message, calendar entry, document, notification 546, etc., accessed by the client device 202, (C) the type of notification 546 that is currently or was most-recently selected within the activity feed 544, (D) the current location of the client device 202, (E) the current time of day and/or day of the week, and/or (F) the presence of nearby devices (e.g., Internet of Things (IoT) devices).

At a step 116 of the routine 110, the application associated with the client device 202 may select, based on the determined data, a subset of the plurality of microapp action indicators that were received at the step 112.

Finally, at a step 118 of the routine 110, the client device 202 may be caused to present one or more selectable user interface elements (e.g., the links 106a-e shown in FIG. 1A) corresponding to the subset of the microapp action indicators selected at the step 116. In some implementations, upon selection of such a user interface element (e.g., a link 106), the client device 202 may either (B) immediately send a message (e.g., as indicated by an arrow 122 in FIG. 1B) to the computing system 108a requesting that the computing system 108a take the indicated action with respect to a system of record 526, or (B) present a user interface for a microapp that enables the user 524 to select one or more particular actions to take with respect to a system of record 526. In either case, the process may result in a message being sent to the computing system 108a (e.g., as indicated by the arrow 122) instructing the computing system 108a to take a particular action with respect to a system of record 526. As indicated by an arrow 124 in FIG. 1B, upon receiving such an instruction from the client device 202, the computing system 108a may instruct the system of record 526 to perform the requested action. In some implementations, for example, the computing system 108a may perform the action with respect to the system of record 526 by retrieving access credentials of the user 524 and using those access credentials to make one or more application programming interface (API) calls to the system of record 526 on behalf of the user 524.

FIG. 1C shows a second example routine 140 that may be performed, at least in part, by an application associated with the client device 202 (e.g., the resource access application 522) of the system 100 to present the actions list 104 shown in FIG. 1A. As indicated by an arrow 126 in FIG. 1C, in accordance with the routine 140, the application associated with the client device 202 may receive, from the computing system 108a, action/context mapping data 128 indicative of associations between available types of microapp actions and possible contextual states of the client device 202. An example technique that may be employed by the application associated with the client device 202 to use the action/context mapping data 128 to select a subset of available microapp actions to present (e.g., within the actions list 104) based on contextual data (e.g., indicative of a current contextual state of the client device 202) is described further below.

FIG. 1D shows another example routine 160 which includes the same steps as the routine 140 (shown in FIG. 1C) but which may instead be performed, at least in part, by the computing system 108b. As shown in FIG. 1D, in accordance with the routine 160, the action/context mapping data 128 (indicating associations between available types of microapp actions and possible contextual states of the client device 202) may remain at the computing system 108b. As indicated by an arrow 172, in the implementation shown in FIG. 1D, the computing system 108b may receive contextual data indicative of a current contextual state of the client device 202 and, as indicated by an arrow 174, may instruct an application associated with the client device 202 (e.g., the resource access application 522) to include one or more selected microapp actions in the actions list 104 based on that contextual data. An example technique that the computing system 108b may employ to use the action/context mapping data 128 to select a subset of available microapp actions for the actions list 104 based on the contextual data received from the client device 202 is described further below.

The routine 140 (shown in FIG. 1C), which may be performed, at least in part, by an application associated with the client device 202 (e.g., the resource access application 522), will now be described. As shown in FIG. 1C, at a step 142 of the routine 140, the application associated with the client device 202 may determine a plurality of indicators of respective microapp actions that the computing system 108a is configured to take with respect to systems of record 526 in response to user input to the client device 202. For example, in some implementations, the resource management services 502 (shown in FIGS. 5C and 5D) may enumerate available microapp actions, along with other resources that are available to the client device 202, to the resource access application 522 of the client device 202 after the user 524 successfully authenticates to the multi-resource access system 500. In such implementations, the application associated with the client device 202 may thus make the determination of the step 142 based on that enumeration of available microapp actions.

At a step 144 of the routine 140, the application associated with the client device 202 may determine that first data (e.g., a portion of the action/context mapping data 128) is associated with a first indicator of the plurality of indicators, the first indicator corresponding to a first microapp action type (e.g., "upload to ShareFile") that the computing system 108a is configured to take with respect to a first system of record 526 (e.g., the ShareFile system). In the example shown in FIG. 1C, for instance, one of the microapp action indicators received from the computing system 108a may indicate that a microapp action of "type C" is available for use by the application associated with the client device 202, and the action/context mapping data 128 may include an "action type" identifier 134 for the microapp action of "type C." As such, the application associated with the client device 202 may determine that a portion of the action/context mapping data 128 (i.e., the bottom row shown in FIG. 1C) is associated with the received "type C" microapp action indicator.

As shown, in some implementations, the "action type" identifiers 134 of the action/context mapping data 128 may be associated with respective "context type" identifiers 136 as well as respective "context value" identifiers 138. For the "type C" action type identifier 134 shown in FIG. 1C, for example, the action/context mapping data 128 includes both a "context type" identifier 136 having a value "C3" and a "context value" identifier 138 having a value "123." In some implementations, the "context type" identifiers 136 may indicate the respective types of contextual data that are to be evaluated to determine whether to include user interface elements (e.g., links 106) in the actions list 104, and the "context value" identifiers 138 may indicate particular values for the indicated types of contextual data that are to trigger the inclusion of such user interface elements on the actions list 104. Per the example noted above, for instance, a "context type" identifier 136 having a value "C3" may indicate that the contextual data that is to be evaluated is the foreground and/or active windows of the client device 202 (or of a virtual machine delivering one or more applications and/or desktops to the client device 202), and a "context value" identifier 138 having a value of "123" may indicate the type of foreground and/or active window that is to trigger the inclusion of a user interface element for a microapp action of the "type C" is "Adobe Acrobat." The microapp action of the "type C" may, for example, be an "Upload to ShareFile" microapp action, as described above. Accordingly, in some implementations, the first data referenced in the step 144 may correspond to the value of one of the "context value" identifiers 138.

At a step 146 of the routine 140, the application associated with the client device 202 may determine second data that is indicative of a current contextual state of the client device 202. For example, the second data may indicate that a foreground and/or active window for Adobe Acrobat is open on the client device 202 (or on a virtual machine that is delivering one or more applications and/or desktops to the client device 202).

At a step 148 of the routine 140, the application associated with the client device 202 may determine that the second data (e.g., data indicating that a foreground and/or active window for Adobe Acrobat is open) matches the first data (e.g., a "context value" identifier 138 identifying "Adobe Acrobat").

At a step 150 of the routine 140, the client device 202 may be caused to present a first selectable user interface element (e.g., a link 106 for an "Upload to ShareFile" microapp action) corresponding to the first indicator (e.g., an indicator of the "Upload to ShareFile" microapp action) within the actions list 104 or otherwise.

In some implementations, upon selection of the first user interface element (e.g., a link 106), the client device 202 may either (B) immediately send a message (e.g., as indicated by an arrow 122 in FIG. 1C) to the computing system 108*a* requesting that the computing system 108*a* take the indicated action with respect to a system of record 526 (e.g., the ShareFile® system), or (B) present a user interface for a microapp that enables the user 524 to select one or more particular actions to take with respect to a system of record 526 (e.g., the ShareFile® system). In either case, the process may result in a message being sent to the computing system 108*a* (e.g., as indicated by the arrow 122) instructing the computing system 108*a* to take a particular action (e.g., "Upload to ShareFile") with respect to a system of record 526 (e.g., the ShareFile® system). As indicated by an arrow 124 in FIG. 1C, upon receiving such an instruction from the client device 202, the computing system 108*a* may instruct the system of record 526 (e.g., the ShareFile® system) to perform the requested action (e.g., uploading a document). In some implementations, for example, the computing system 108*a* may perform the action with respect to the system of record 526 by retrieving access credentials of the user 524 and using those access credentials to make one or more application programming interface (API) calls to the system of record 526 on behalf of the user 524.

The routine 160 (shown in FIG. 1D), which may be performed, at least in part, by the computing system 108*b*, will now be described. As shown in FIG. 1D, at a step 162 of the routine 160, the computing system 108*b* may determine a plurality of indicators of respective microapp actions that the computing system 108*b* is configured to take with respect to systems of record 526 in response to user input to the client device 202. For example, in some implementations, the resource management services 502 (shown in FIGS. 5C and 5D) may enumerate or otherwise identify available microapp actions, along with other resources that are available to the client device 202, to the resource access application 522 of the client device 202 after the user 524 successfully authenticates to the multi-resource access system 500. In such implementations, the computing system 108*b* may thus make the determination of the step 162 based on that availability of microapp actions.

At a step 164 of the routine 160, the computing system 108*b* may determine that first data (e.g., a portion of the action/context mapping data 128 stored at the computing system 108*b*) is associated a first indicator of the plurality of indicators, the first indicator corresponding to a first microapp action type that the computing system 108*b* is configured to take with respect to a first system of record 526. In the example shown in FIG. 1D, for instance, one of the microapp action indicators determined at the step 162 may indicate that a microapp action of "type B" is available for use by the client device 202, and the action/context mapping data 128 may include an "action type" identifier 134 for the microapp action of "type B." As such, the computing system 108*b* may determine that a portion of the action/context mapping data 128 (i.e., the row second from the bottom) is associated with the "type B" microapp action indicator determined at the step 162.

As discussed above in connection with FIG. 1C, in some implementations, the "action type" identifiers 134 of the action/context mapping data 128 may be associated with respective "context type" identifiers 136 as well as respective "context value" identifiers 138. For the "type B" action type identifier 134 shown in FIG. 1D, for example, the action/context mapping data 128 includes both a "context type" identifier 136 having a value "C2" and a "context value" identifier 138 having a value "Z." As noted above, in some implementations, the "context type" identifiers 136 may indicate the respective types of contextual data that are to be evaluated to determine whether to include user interface elements (e.g., links 106) in the actions list 104, and the "context value" identifiers 138 may indicate particular values for the indicated types of contextual data that are to trigger the inclusion of such user interface elements in the actions list 104. A "context type" identifier 136 having a value "C2" may, for example, indicate that the contextual state data that is to be evaluated is the geographic location of the client device 202, and a "context value" identifier 138 having a value of "Z" may indicate a range of geographic coordinates that is to trigger the inclusion of a user interface element for a microapp action of the "type B." The microapp action of the "type B" may, for example, be a "Complete COVID-19 Certification" microapp action and the indicated range of geographic coordinates may correspond to a region at an entrance of an office building of the user's employer. Accordingly, in some implementations, the first data referenced in the step 164 may correspond to the value of one of the "context value" identifiers 138.

At a step 166 of the routine 160, the computing system 108*b* may determine second data that is indicative of a current contextual state of the client device 202. As noted previously, as indicated by the arrow 172 in FIG. 1D, the computing system 108*b* may receive (e.g., from the client device 202) contextual data indicative of a current contextual state of the client device 202. In some implementations, for example, the client device 202 may send such contextual data to the computing system 108*b* in connection with a request for a list of selected microapp actions based on that contextual data. The second data determined at the step 166 may, for example, indicate a current geographic location of the client device 202. As described in more detail below in Section F, in some implementations, the computing system 108*b* may receive a request for an updated actions list 104 from an application associated with the client device 202 (e.g., the resource access application 522) and, in response to such a request, may send that application a request for certain types of contextual data that the computing system 108*b* determines, e.g., based on the action/context mapping data 128, is needed to determine whether to include certain microapp actions on the actions list 104. In other implementations, the contextual data, e.g., as indicated by the arrow 172 in FIG. 1D, may accompany a request from an application associated with the client device 202 (e.g., the resource access application 522) for an updated actions list 104.

At a step 168 of the routine 160, the computing system 108*b* may determine that the second data (e.g., the current geographic coordinates of the client device 202) matches the first data (e.g., a "context value" identifier 138 corresponding to a region at an entrance to an office space of the user's employer).

At a step 170 of the routine 160, the computing system 108b may cause the client device 202 to present a first selectable user interface element (e.g., a link 106 for a "Complete COVID-19 Certification" microapp action) corresponding to the first indicator (e.g., an indicator of the "Complete COVID-19 Certification" microapp action). For example, as indicated by the arrow 174 shown in FIG. 1D, the computing system 108b may instruct the client device 202 to include a user interface element for the "Complete COVID-19 Certification" microapp action in the actions list 104.

In some implementations, upon selection of the first user interface element (e.g., a link 106), the client device 202 may either (B) immediately send a message (e.g., as indicated by an arrow 122 in FIG. 1D) to the computing system 108b requesting that the computing system 108b take the indicated action with respect to a system of record 526 (e.g., a COVID-19 certification tracking system), or (B) present a user interface for a microapp that enables the user 524 to select one or more particular actions to take with respect to a system of record 526 (e.g., a COVID-19 certification tracking system). In either case, the process may result in a message being sent to the computing system 108b (e.g., as indicated by the arrow 122) instructing the computing system 108b to take a particular action (e.g., "Complete COVID-19 Certification") with respect to a system of record 526 (e.g., a COVID-19 certification tracking system). As indicated by the arrow 124 in FIG. 1D, upon receiving such an instruction from the client device 202, the computing system 108b may instruct the system of record 526 (e.g., a COVID-19 certification tracking system) to perform the requested action (e.g., storing a record indicating that a user has completed a COVID-19 certification prior to entering the office space). In some implementations, for example, the computing system 108b may perform the action with respect to the system of record 526 by retrieving access credentials of the user 524 and using those access credentials to make one or more application programming interface (API) calls to the system of record 526 on behalf of the user 524.

Although not shown in FIGS. 1C and 1D, it should be appreciated that in some implementations, the system 100 may be configured such that multiple context types and corresponding context values can be associated with a given action type identifier 134, and such that determined context data of the indicated types may need to match two or more of the context values associated with that action type identifier in order for a particular microapp action to be presented on the actions list 104. For example, in some implementations, a particular action (e.g., "Complete COVID-19 Certification") may be presented on the actions list 104 only if (A) the client device 202 is within a particular geographic region, (B) it is currently a weekday (i.e., Monday-Friday), and (C) the time of day is within a particular window, e.g., between 8:00 AM and 10:00 AM.

Additional details and example implementations of embodiments of the present disclosure are set forth below in Section F, following a description of example systems and network environments in which such embodiments may be deployed.

B. Network Environment

Figure 2:
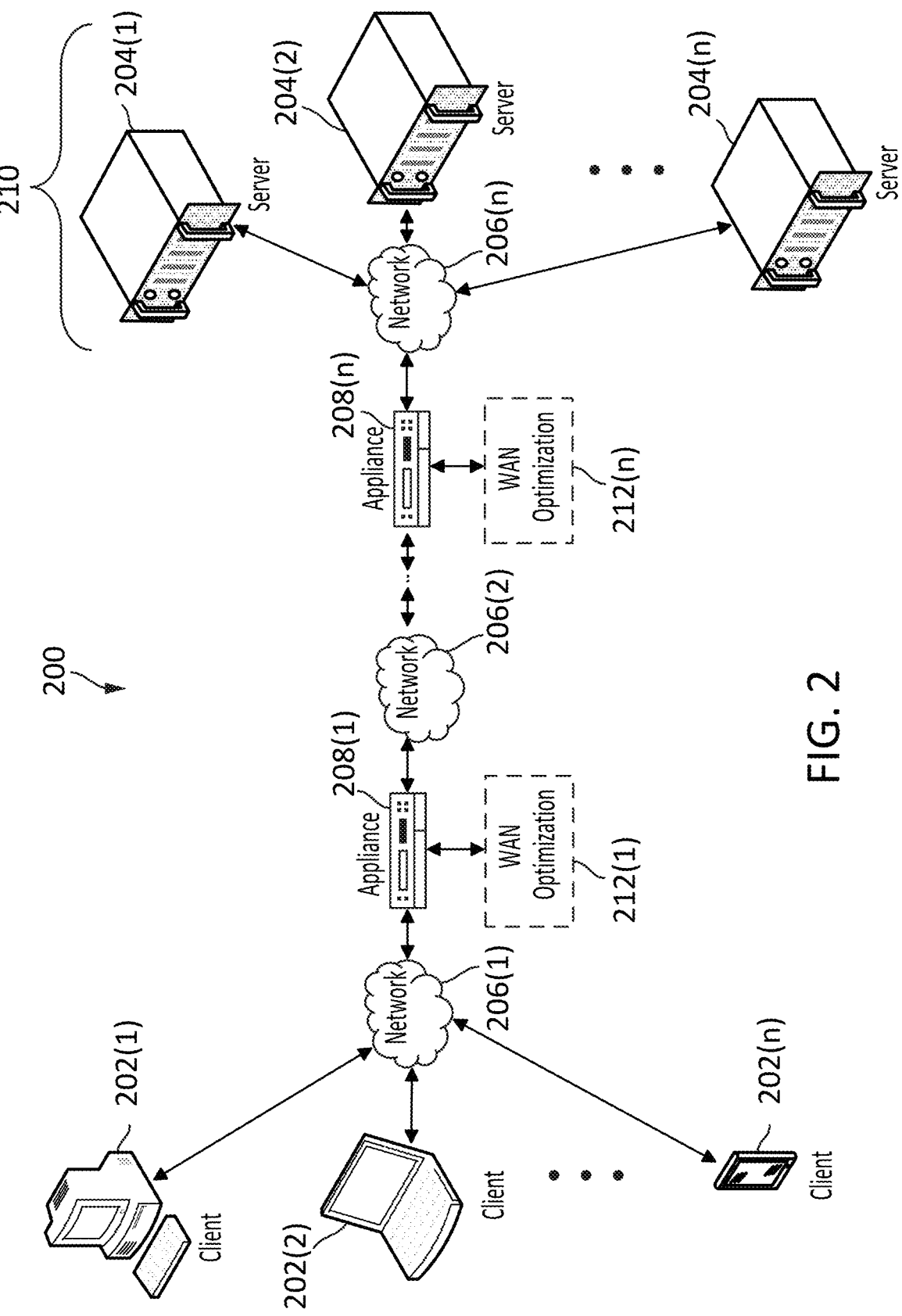
FIG. 2 is a diagram of a network environment in which some embodiments of the system for presenting available microapp actions based on contextual information disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
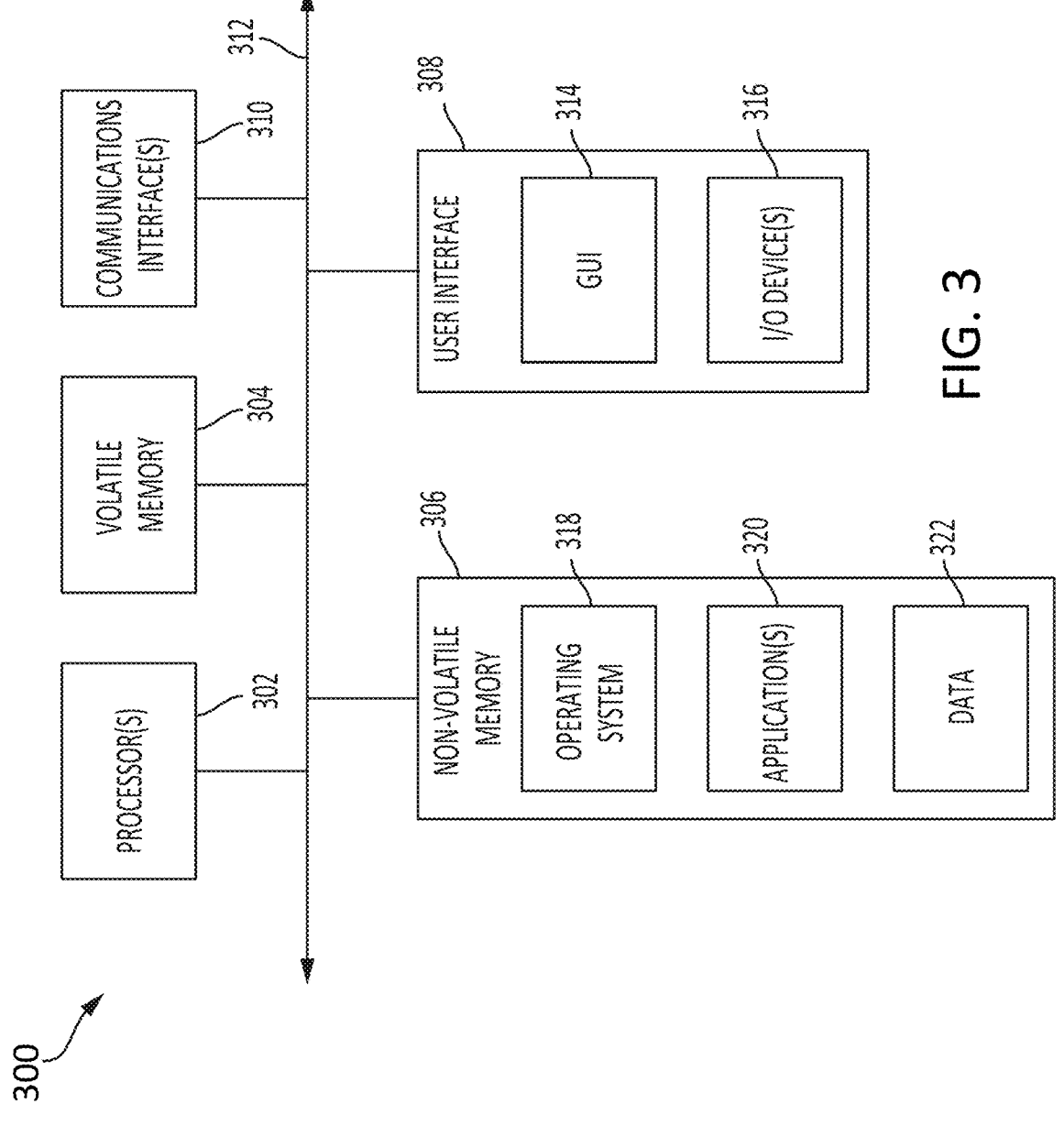
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
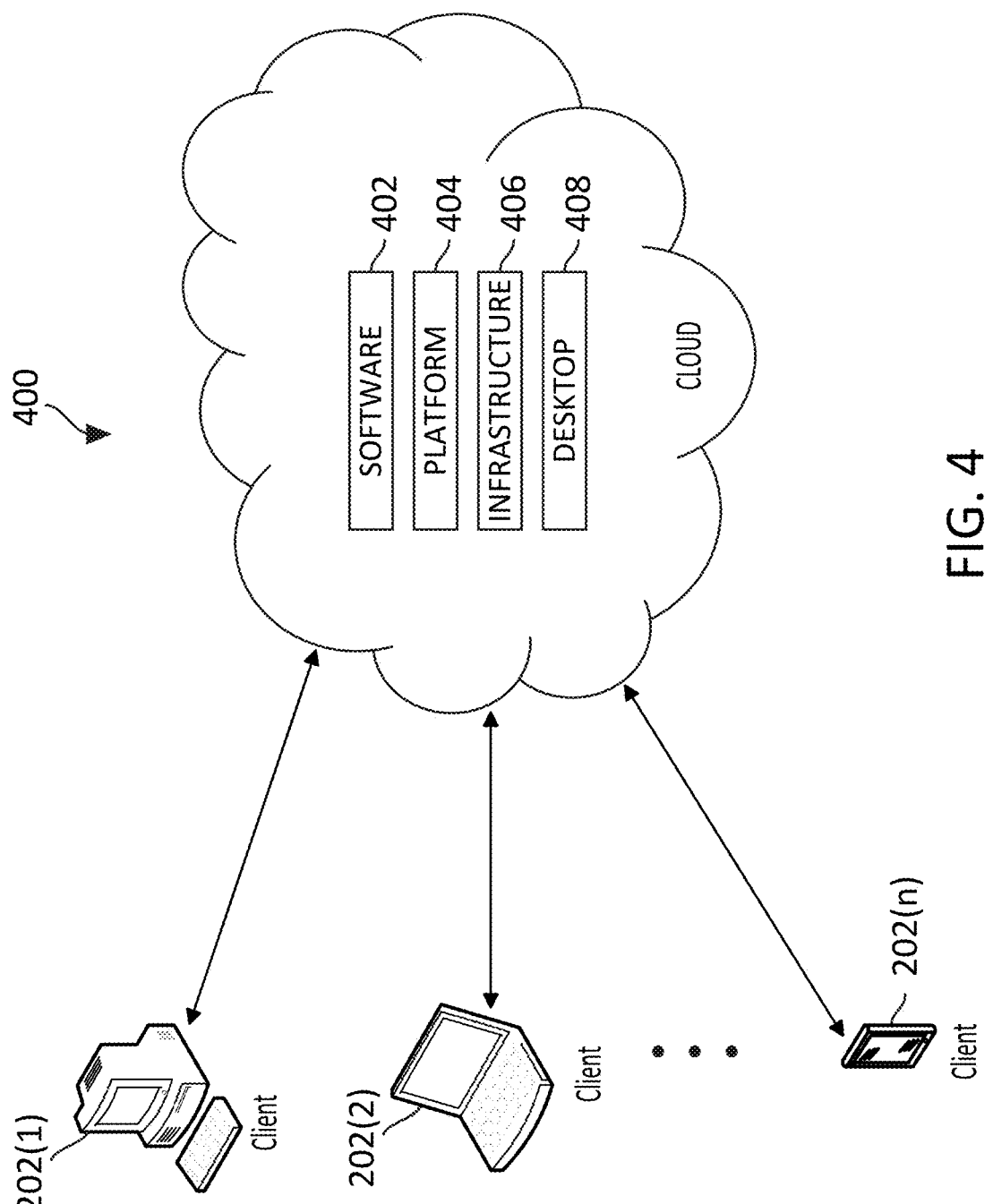
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc. of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile® from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B)

may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., ShareFile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522.

The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream or otherwise provide the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile® platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

Figures 6, 11:
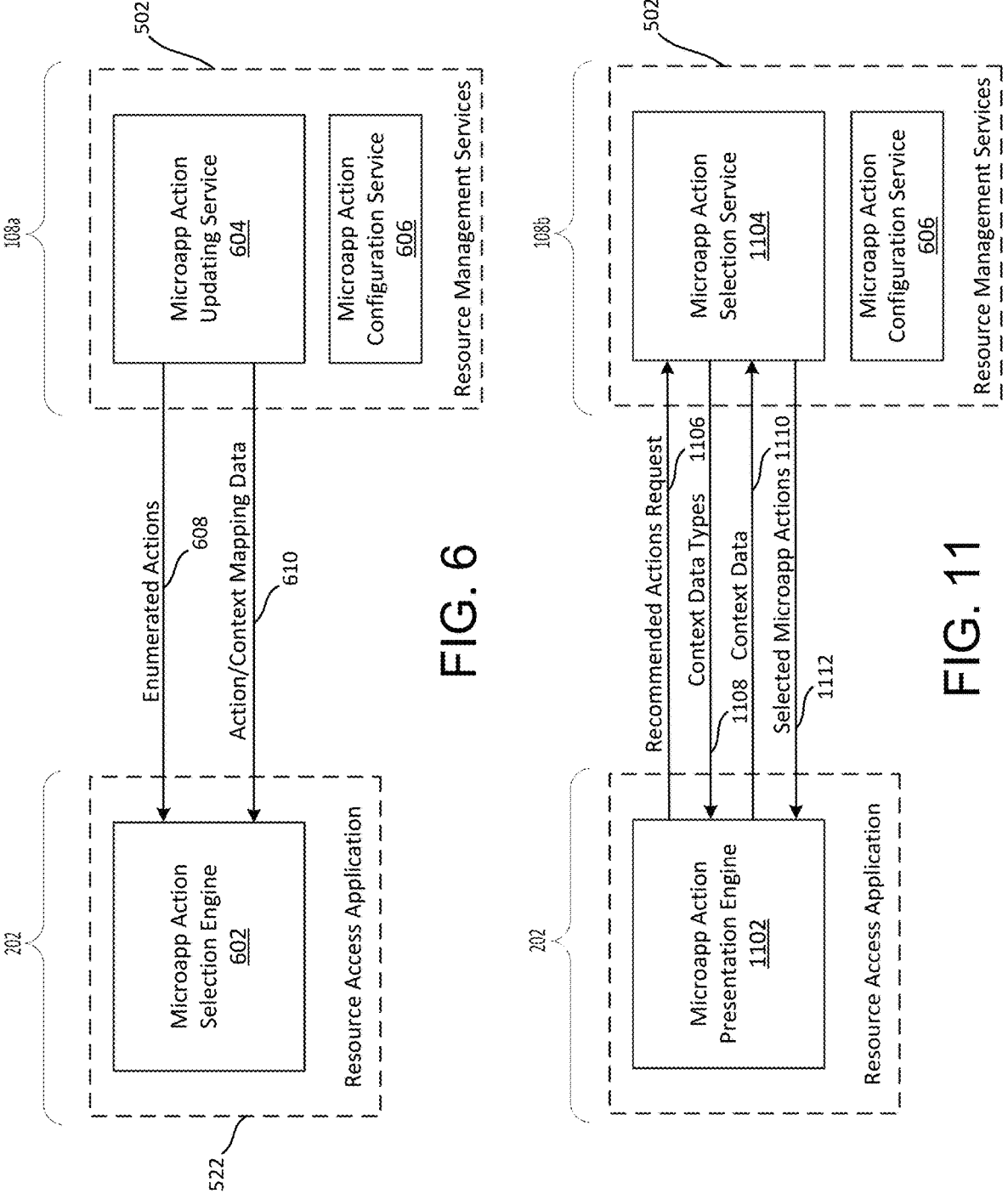
FIG. 6 shows components that may be employed within the client device and computing system of the example implementations of the systems for presenting available microapp actions based on contextual information shown in FIGS. 1B and 1C.
FIG. 11 shows components that may be employed within the client device and computing system of the example implementations of the system for presenting available microapp actions based on contextual information shown in FIG. 1D.

F. Detailed Description of Example Embodiments of Systems for Presenting Available Microapp Actions Based on Contextual Information As described above (in Section A) in connection with FIG. 1C, in some implementations of the present disclosure, an application associated with a client device 202 (e.g., the resource access application 522 described above in connection with FIGS. 5B and 5C) may receive (from a computing system 108a) a list of enumerated actions that a user 524 of the application is authorized to take with respect to systems of record 526, and may also receive (from the computing system 108a) action/context mapping data 128 that the application may use to determine a subset of the enumerated microapp actions that are to be presented on an actions list 104 when the client device 202 is in particular contextual states. FIG. 6 is a block diagram showing example components that may be used in connection with some such implementations.

As shown in FIG. 6, in some implementations, the resource access application 522 may be configured with a microapp action selection engine 602. As described above in connection with FIGS. 5B and 5C, the resource access application 522 may be executed on a client device 202 or may be executed on a Web server and accessed by a client device 202 via a browser. As also shown in FIG. 6, in some implementations, the computing system 108a (shown in FIGS. 1B and 1C) may be embodied by the resource management services 502 (also described in connection with in FIGS. 5B and 5C). In particular, as illustrated, the resource management services 502 may be configured with a microapp action updating service 604 and a microapp action configuration service 606. As described above in connection with FIGS. 5B and 5C, the resource management services 502 may be executed on one or more servers 204, and may possibly be embodied within a cloud computing environment 512.

Figure 7:
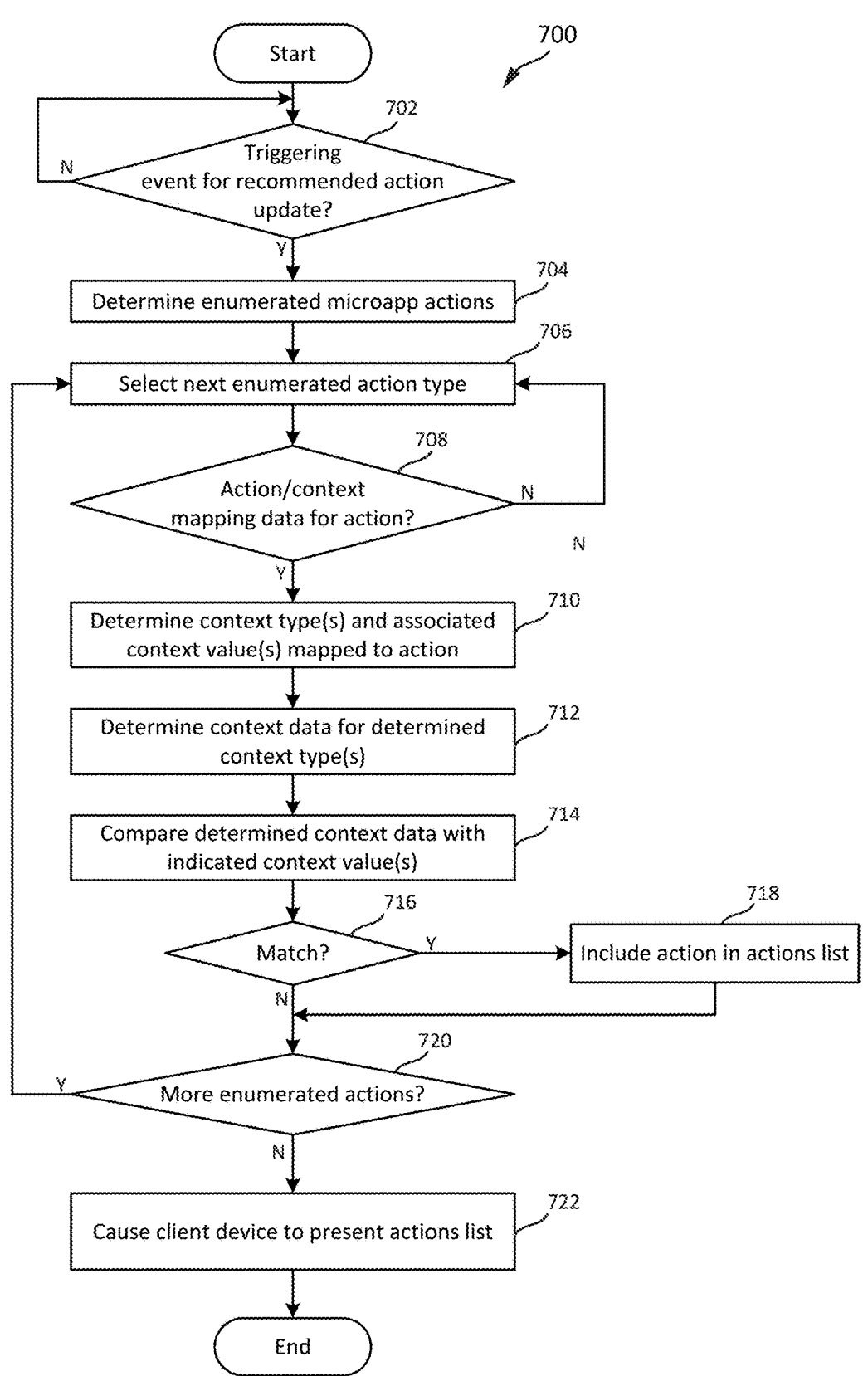
FIG. 7 shows an example routine that may be performed by the system for presenting available microapp actions based on contextual information shown in FIG. 6.

FIG. 7 shows an example routine 700 that may be performed by the microapp action selection engine 602 shown in FIG. 6. In some implementations, the microapp action selection engine 602 may be embodied by one or more processors and one or more computer-readable media encoded with instructions which, when executed by the one or more processors, may cause a computing system (e.g., a client device 202 or a Web server executing the resource access application 522) to perform some of all of the indicated steps of the routine 700. The example routine 700 will be described in more detail below.

Figure 8:
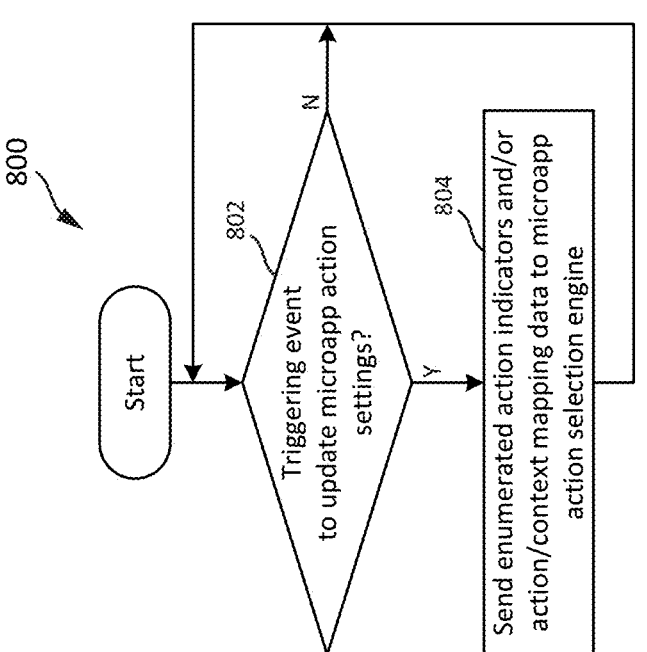
FIG. 8 shows an example routine that may be performed by the microapp action updating service shown in FIG. 6.

FIG. 8 shows an example routine 800 that may be performed by the microapp action updating service 604 shown in FIG. 6. In some implementations, the microapp action updating service 604 may be embodied by one or more processors and one or more computer-readable media encoded with instructions which, when executed by the one or more processors, may cause a computing system (e.g., one or more servers 204) to perform some of all of the indicated steps of the routine 800. The example routine 800 will also be described in more detail below.

Figure 9:
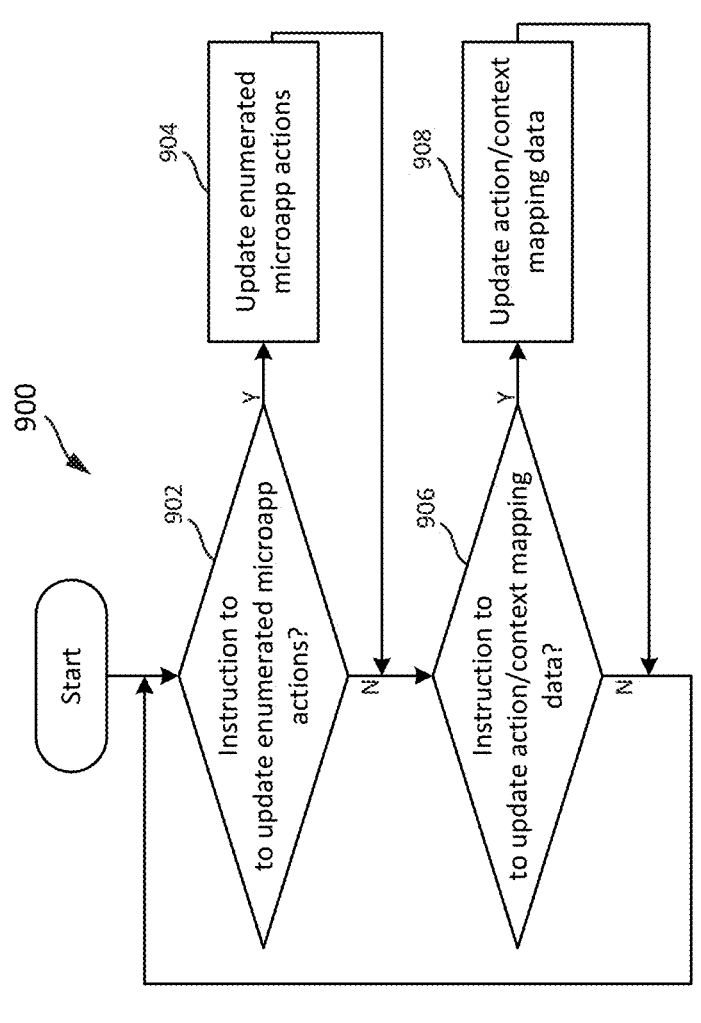
FIG. 9 shows an example routine that may be performed by the microapp action configuration service 606 shown in FIGS. 6 and 11.

FIG. 9 shows an example routine 900 that may be performed by the microapp action configuration service 606 shown in FIG. 6. In some implementations, the microapp action configuration service 606 may be embodied by one or more processors and one or more computer-readable media encoded with instructions which, when executed by the one or more processors, may cause a computing system (e.g., one or more servers 204) to perform some of all of the indicated steps of the routine 900. As noted below, the routine 900 may likewise be performed by the microapp action configuration service 606 in connection with the example implementation described below in connection with FIG. 11.

As shown in FIG. 9, the routine 900 may begin at a decision step 902, at which the microapp action configuration service 606 may determine whether it has received an instruction to update the microapp actions that are to be made available to the user 524 of the resource access application 522. In some implementations, such an instruction may be provided by a system administrator who is authorized to configure the resource management services 502. In other implementations, such an instruction may additionally or alternatively be generated in response to a determination that the user 524 has been provided with access to a new system of record 526 for which an existing microapp action is available, or that a new microapp action has become available for a system of record 526 that was previously accessible to the user 524.

When, at the decision step 902, the microapp action configuration service 606 determines that it has received an instruction to update the microapp actions that are to be made available to the user 524, the routine 900 may proceed to a step 904, at which one or more records indicative of the microapp actions that are to be made available to the user 524 may be updated, e.g., by storing indicators of such actions in one or more storage mediums of the resource management services 502.

At a decision step 906 of the routine 900, the microapp action configuration service 606 may determine whether it has received an instruction to update the action/context mapping data 128 for the user 524. In some implementations, such an instruction may be provided by a system administrator who is authorized to configure the resource management services 502. In other implementations, such an instruction may be provided by the user 524 of the resource access application 522. For example, in some implementations, the resource management services 502 and/or the resource access application 522 may present an "actions wizard" user interface that allows a system administrator or the user 524 to specify parameters defining particular contextual scenarios in which certain microapp actions are to appear on the actions list 104. As an example, such an "actions wizard" may present a first drop down menu allowing the system administrator and/or the user 524 to select a "context type" value, such as "location," a second drop down menu allowing the system administrator and/or the user 524 to specify a "context value" for the selected "context type," such as "office," and a third drop down menu allowing the system administrator and/or the user 524 to select one of the microapp action types that has been enumerated or otherwise made available to the resource access application 522. Further, as noted above at the end of Section A, in some implementations, multiple such conditions may be specified for certain "action type" identifiers 134, and the system may enable a system administrator and/or the user 524 to specify parameters for such multiple conditions. And still further, in some implementations, such an instruction to update the action/context mapping data 128 for the user 524 may additionally or alternatively be generated by a component of the resource management services 502, e.g., by the analytics service 536 shown in FIG. 5C, based on analysis of collected historical data collected concerning the user's use of microapp actions in particular contextual situations.

When, at the decision step 906, the microapp action configuration service 606 determines that it has received an instruction to update the action/context mapping data 128, the routine 900 may proceed to a step 908, at which one or more records indicative of the action/context mapping data 128 may be updated, e.g., by adding, deleting, or modifying rows to a table of the action/context mapping data 128 that is maintained within the resource management services 502 for the user 524.

Referring next to FIG. 8, the example routine 800, which may be performed by the microapp action updating service 604 shown in FIG. 6, will now be described. As shown in FIG. 8, at a decision step 802, the microapp action updating service 604 may determine whether a triggering event for updating the settings for microapp actions available to the resource access application 522 has occurred. In some implementations, such a triggering event may be the successful authentication of a user 524 of the resource access application 522 to the resource management services 502, e.g., via the identity service 516 described above in connection with FIG. 5B. Additionally or alternatively, in some implementations, a triggering event may be a message received from the resource access application 522 requesting updated microapp action settings. For example, the resource access application 522 may send such a request to the microapp action updating service 604 in response to the user 524 selecting a user interface element requesting that the actions list 104 be presented, and/or in response to the resource access application 522 detecting a change to the state of the client device 202 that might trigger a change to the microapp actions in the actions list 104. Additionally or alternatively, in some implementations, such a triggering event may be the elapsing of a particular period of time. For instance, in some implementations, the microapp action updating service 604 may determine that a triggering event per the decision step 802 occurs once every hour, or at some other suitable interval.

In any event, when the microapp action updating service 604 determines (at the decision step 802) that such a triggering event has occurred, the routine 800 may proceed to a step 804, at which the microapp action updating service 604 may send to the resource access application 522 (A) indicators of the microapp actions that have been enumerated for use by the resource access application 522 (e.g., based on the identity of the user 524 who authenticated to the resource management services 502), as indicated by an arrow 608 in FIG. 6, and/or (B) action/context mapping data 128 that has been configured for the user 524 (e.g., by the microapp action configuration service 606, as described above), as indicated by an arrow 610 shown in FIG. 6. Various examples of such enumerated microapp actions and action/context mapping data 128, as well as the manner in which the action/context mapping data 128 may be used to determine the enumerated microapp actions that are to be presented in the actions list 104 based on a determined contextual state of the client device 202, are provided below.

Referring next to FIG. 7, the example routine 700, which may be performed by the microapp action selection engine 602 shown in FIG. 6, will now be described. As shown in FIG. 7, at a decision step 702, the microapp action selection engine 602 may determine whether a triggering event for updating the actions list 104 has occurred. In some implementations, such a triggering event may be a determination by the microapp action selection engine 602 that a contextual state of the client device 202 has changed in a way that might trigger a change to the microapp actions in the actions list 104. Additionally or alternatively, in some implementations, a triggering event may be a determination by the microapp action selection engine 602 that the user 524 has selected a user interface element requesting that the actions list 104 be presented and/or updated. Additionally or alternatively, in some implementations, such a triggering event may be the elapsing of a particular period of time. For instance, in some implementations, the microapp action selection engine 602 may determine that a triggering event per the decision step 702 occurs once every minute, or at some other suitable interval.

In any event, when the microapp action selection engine 602 determines (at the decision step 702) that such a triggering event has occurred, the routine 700 may proceed to a step 704, at which the microapp action selection engine 602 may determine the various microapp actions that have been enumerated or otherwise made available to the resource access application 522, e.g., based on the information concerning available microapp actions that was provided by the microapp action updating service 604 as indicated by the arrow 608 shown in FIG. 6.

Per a step 706 and a decision step 720, the microapp action selection engine 602 may evaluate the individual enumerated microapp actions identified at the step 704, to determine whether those microapp actions are to be included in the actions list 104 based on a current contextual state of the client device 202. Although the routine 700 indicates that the enumerated microapp actions are evaluated one at a time, it should be appreciated that, in practice, the evaluation of the enumerated microapp actions may instead proceed, in whole or in part, in parallel.

At a decision step 708, the microapp action selection engine 602 may evaluate the action/context mapping data 128 for the user 524 to determine whether it includes any entries for the microapp action type selected at the step 706.

FIG. 10 shows an example table 1000 including action/context mapping data 128 for the user 524. To perform the decision step 708, the microapp action selection engine 602 may, for example, determine whether one or more of the "microapp action type" entries 134 in the table 1000 correspond to the microapp action type selected at the step 706.

When, at the decision step 708, the microapp action selection engine 602 determines that the action/context mapping data 128 for the user 524 includes at least one set of entries for the microapp action type selected at the step 706, the routine 700 may proceed to a step 710, at which the microapp action selection engine 602 may determine the types of context data that are to be evaluated to determine whether to include corresponding microapp actions on the actions list 104, as well as the values that contextual data needs to satisfy to trigger the inclusion of those microapp actions on the actions list 104. With reference to the table 1000 (shown in FIG. 10), for example, for the respective "microapp action type" entries 134 that match the microapp action type selected at the step 706, the microapp action selection engine 602 may determine the corresponding "context types(s)" entries 136 and "context value(s)" entries 138 in the table 1000.

At a step 712 of the routine 700, the microapp action selection engine 602 may determine context data for the context type(s) identified at the step 710. As described in more detail below in connection with a step 714, the microapp action selection engine 602 may compare the context data determined at the step 712 with the context value(s) reflected in the action/context mapping data 128 for the indicated context data type(s), e.g., as "context value(s)" entries 138 in the table 1000. Components used to determine the context data (per the step 712) may be located either on the client device 202, or on one or more servers, e.g., within a virtual desktop infrastructure (VDA)/virtual delivery agent (VDA) session, that is delivering one or more desktops or applications to the client device 202. The microapp action selection engine 602 may determine the context data, per the step 712, in any of a number of ways, and the techniques employed to determine such context data may depend on the nature of context data type(s) identified at the step 710 and/or the computing environment in which the client device 202 is operating. Examples of suitable techniques will now be described with reference to the example "context type(s)" entries 136 that are included in the table 1000 shown in FIG. 10.

As shown in FIG. 10, rows 1002 and 1004 of the table 1000 indicate context types, i.e., per "context type(s)" entries 136, of "foreground window." These entries may indicate, for example, that the microapp action selection engine 602 is to determine the operating system window that is currently in the foreground on the client device 202 or on a virtual desktop being delivered to the client device 202), thus enabling the microapp action selection engine 602 to subsequently determine (at the step 714) whether the foreground window matches the value indicated for one or more of the corresponding "context value(s)" entries 138. The microapp action selection engine 602 may determine the foreground window, for example, by employing one or more callbacks/hooks that cause the operating system to notify the microapp action selection engine 602 of the foreground window. In some implementations, for example, a SetWinEventHook API may be used to receive a callback when the foreground window presented on the client device 202 changes. Such a callback may receive various window details from which information concerning the process may be derived by various API calls, such as a GetWindow- ThreadProcessId API. In some implementations, the "context type(s)" entries may additionally or alternatively specify one or more other characteristics of windows that are to be evaluated, such as whether they are "active," "minimized," "maximized," presented on a primary display screen, etc.

Row 1006 of the table 1000 indicates a set of two of the same context types, i.e., "message text." Row 1008, on the other hand indicates a set of two different context types, i.e., "calendar text" and "calendar entry type." In some implementations, the presence of multiple "context type(s)" entries 136 for the same "microapp action type" entry 134 may indicate that context data of each of the specified types needs to match the corresponding "context value(s)" entries 138 if the indicated microapp action is to be included in the actions list 104. Also, in some implementations, the presence of multiple context values corresponding to the same context type entry 136, e.g., the values "team" and "group" corresponding to the "context value(s)" entry 138 of "calendar text" in the row 1008, may indicate that the existence of context data matching any one or more of the indicated context values is sufficient to satisfy the criteria for that context value.

Under such a rubric, for the row 1006, the context type of "message text" (both instances) may indicate that, at the step 712, the microapp action selection engine 602 is to determine the text of messages that are currently open, e.g., a Slack or Teams messages, within an application executing on the client device 202 or within a virtual application being delivered to the client device 202, and/or that were recently received by such an application. With respect to the corresponding "context value(s) entries 138 in the row 1006, the listed values may indicate that, in order for the indicated microapp action (i.e., "create expense report"—e.g., via a expense reporting SaaS or other application, such as Concur) to be included in the actions list 104, the microapp action selection engine 602 must, at the step 714, determine that both (A) at least one of the words "expense," "cost," and "price" is included in the determined message text, and (B) the word "report" is included in the determined message text.

The existence of a currently open message, e.g., a Slack or Teams message, as well as the text included within such a message, may be determined in any of numerous ways. In some implementations, the microapp action selection engine 602 may, at the step 712, acquire the pertinent data/details, for example, using a user interface (UI) monitor, operating system hooks, or the like. In some implementations, for example, UI Automation provided by the Microsoft Windows operating system may be used to identify various user interface elements and their attributes and values. Further, in some implementations, system hooks for the foreground window may additionally or alternatively be used to obtain the process and window details from which pertinent information may be derived, such as window title, window handle, process id, process name, etc. And still further, in some implementations, if supported by the application, a bot or plugin may additionally or alternatively be loaded inside the application, such as by using Microsoft Teams tool kit, Slack app integrations, web browser plugin/addin, etc., that can process the event/message details.

For the row 1008 in the table 1000, the context types of "calendar text" and "calendar entry type" may indicate that, at the step 712, the microapp action selection engine 602 is to determine the text of a calendar entry, if any, and the type of calendar entry (e.g., "meeting," "event," "appointment," etc.), if any, in the user's calendar (e.g., a Microsoft Outlook calendar) for the current time slot, i.e., the time slot during at which the determination of the step 712 is made. With respect to the corresponding "context value(s)" entries 138 in the row 1008, the listed values may indicate that, in order for the indicated microapp action (i.e., "my tickets"—e.g., for a task management application, such as Jira) to be included in the actions list 104, the microapp action selection engine 602 must, at the step 714, determine that both (A) at least one of the words "team" and "group" is included in the determined calendar entry text, and (B) the calendar entry for the current time slot is of the type "meeting."

In some implementations, the microapp action selection engine 602 may, at the step 712, acquire the pertinent data/details with respect to the user's calendar, e.g., a Microsoft Outlook calendar, for example, using a user interface (UI) monitor, operating system hooks, or the like. Several examples of techniques that may be used to gather such information are described above. In addition, for at least some email applications, an addin, such as an Office 365 web addin, may additionally or alternatively be used to obtain certain email details, such as "subject," "details," "from," "to," etc.

For the row 1010 in the table 1000, the context type of "location" may indicate that, at the step 712, the microapp action selection engine 602 is to determine the current location (e.g., geographic coordinates) of the client device 202. With respect to the corresponding "context value(s)" entry 138 in the row 1010, the listed value (i.e., "office entrance") may indicate that, in order for the indicated microapp action (i.e., "COVID-19 Self Certification") to be included in the actions list 104, the microapp action selection engine 602 must, at the step 714, determine that the location of the client device 202 (e.g., the current geographic coordinates of the client device 202 determined at the step 712) matches the location indicated for the "context value (s)" entry 138 (e.g., the geographic coordinates of an entrance on office building of the user's employer).

The microapp action selection engine 602 may, at the step 712, determine the current location of the client device 202 using a global positioning system (GPS) component on the client device 202 or any other suitable location determination device or technique. In some implementations, location information, e.g., GPS coordinates and/or latitude/longitude coordinates, may be fetched using the GPS sensor or one or more location services provided and enabled on a mobile client device. In such a case, the context type(s)" entries 136 and corresponding "context value(s)" entries 138 may specify GPS location data and also a range to define a geofencing area, such as around the entry gates to an office location, near a front desk, etc. The specification of a range may be useful, for example, in circumstances where exact coordinate matching may be difficult or undesireable.

For the row 1012 in the table 1000, the context type of "email text" may indicate that, at the step 712, the microapp action selection engine 602 is to determine the text of currently opened and/or recently received email messages. With respect to the corresponding "context value(s)" entries 138 in the row 1012, the listed values may indicate that, in order for the indicated microapp action (i.e., "create PTO request"—e.g., to create a personal time off (PTO) request within a Workday Software-as-a-Service (SaaS) application) to be included in the actions list 104, the microapp action selection engine 602 must, at the step 714, determine that at least one of the words/phrases "PTO," "holiday," and "time off" is included in the determined email text.

In some implementations, the microapp action selection engine 602 may, at the step 712, acquire text and metadata of emails from a Microsoft Outlook or other email application using a user interface (UI) monitor, operating system hooks, or the like. Several examples of techniques that may be used to gather such information are described above.

For the row 1014 in the table 1000, the context type of "proximate device ID/name" may indicate that, at the step 712, the microapp action selection engine 602 is to determine identifiers for nearby devices, e.g., Internet of Things (IoT) devices, WiFi access points, etc., that are transmitting wireless signals, e.g., WiFi signals, Bluetooth signals, etc. With respect to the corresponding "context value(s)" entries 138 in the row 1014, the listed values may indicate that, in order for the indicated microapp action (i.e., "book conference room") to be included in the actions list 104, the microapp action selection engine 602 must, at the step 714, determine that at least one of the identifiers "xyz123," "abc234," and "Conf. Rm. A" is being wirelessly transmitted by nearby devices.

In some implementations, the microapp action selection engine 602 may, at the step 712, acquire the identifiers and/or other information concerning nearby electronic devices using one or more radios of the client device 202. For indoor cases, location, proximity, geofencing, etc., may be based on the determine proximity of the client device 202 to the IoT device using a Bluetooth beacon, NFC, or similar mechanism. When the client device 202 enters the wireless communication range of an Tot device, the client device 202 may receive the Tot device identifier details, such as its unique ID or name as configured by a system administrator. In such a case, the context type(s)" entries 136 and corresponding "context value(s)" entries 138 may indicate, for example, that such a determined device ID/name needs to match a particular value in order to determine that the client device 202 is in proximity of a particular IoT device.

For the row 1016 in the table 1000, the context type of "notification text" may indicate that, at the step 712, the microapp action selection engine 602 is to determine the text of currently selected and/or recently received notifications 546 (e.g., as described above in connection with FIG. 5D). With respect to the corresponding "context value(s)" entries 138 in the row 1016, the listed values may indicate that, in order for the indicated microapp action (i.e., "create new ticket"—e.g., for a task management application, such as Jira) to be included in the actions list 104, the microapp action selection engine 602 must, at the step 714, determine that at least one of the words "ticket," "problem," and "error" is included in the determined notification text.

In some implementations, the microapp action selection engine 602 may, at the step 712, acquire the text of received notifications 546 and data concerning user interaction with such notifications 546 from a component of the resource access application 522 responsible for handling the notifications 546. Since such notifications 546 are handled by the resource access application 522, the resource access application 522 is able to process the data within those notifications 546.

For the row 1018 in the table 1000, the context type of "selected notification type" may indicate that, at the step 712, the microapp action selection engine 602 is to determine the type of notification 546 (e.g., as described above in connection with FIG. 5D) that is currently and/or was most recently selected, e.g., by the user 524 clicking on a portion of it. With respect to the corresponding "context value(s)" entry 138 in the row 1016, the listed value may indicate that, in order for the indicated microapp action (i.e., "create expense report"—e.g., via a expense reporting SaaS or other application, such as Concur) to be included in the actions list 104, the microapp action selection engine 602 must, at the step 714, determine that the currently and/or most recently selected notification relates to an event of a SalesForce application.

In some implementations, the microapp action selection engine 602 may, at the step 712, acquire data concerning user selection of received notifications 546 from a component of the resource access application 522 responsible for handling the notifications 546. Since such notifications 546 are handled by the resource access application 522, the resource access application 522 is able to obtain and process the data concerning user interactions with those notifications 546.

Referring again to FIG. 7, at a decision step 716 of the routine 700, the microapp action selection engine 602 may determine whether, for the microapp action type selected at the step 706, the context data determined at the step 712 matches the context value(s) in the action/context mapping data 128 for that microapp action type.

When, at the decision step 716, the microapp action selection engine 602 determines that the context data determined at the step 712 matches the corresponding context value(s) in the action/context mapping data 128, the routine 700 may proceed to a step 718, at which the microapp action selection engine 602 may include the microapp action under consideration in the actions list 104. When, on the other hand, the microapp action selection engine 602 determines (at the decision step 716) that the context data determined at the step 712 does not match the corresponding context value(s) in the action/context mapping data 128, the routine 700 may instead proceed to a decision step 720, at which the microapp action selection engine 602 may determine whether any of the enumerated microapp actions identified at the step 704 remain to be evaluated.

When, at the decision step 720, the microapp action selection engine 602 determines that there are additional microapp actions to be evaluated, the routine 700 may return to the step 706, at which the next enumerated microapp action may be selected for evaluation. When, on the other hand, the microapp action selection engine 602 determines that there are no additional microapp actions to be evaluated, the routine 700 may instead proceed to a step 722, at which the microapp action selection engine 602 may cause the client device 202 to present the actions list 104 (e.g., as shown in FIG. 1A), including the various microapp actions that were added to the list 104 per the step 718. Following the step 722, the routine 700 may terminate.

As described above (in Section A) in connection with FIG. 1D, in some implementations of the present disclosure, an application associated with a client device 202 (e.g., the resource access application 522 described above in connection with FIGS. 5B and 5C) may send contextual data, e.g., as indicated by the arrow 172 in FIG. 1D, to the computing system 108b and request that the computing system 108b return an actions list 104, e.g., as indicated by the arrow 174 in FIG. 1D, based on that contextual data. In such an implementation, the action/context mapping data 128 described above may be used by the computing system 108b to determine a subset of microapp actions that have been enumerated to the client device 202 for inclusion in the actions list 104 when the client device 202 is in particular contextual states. FIG. 11 is a block diagram showing example components that may be used in connection with some such implementations.

As shown in FIG. 11, in some implementations, the resource access application 522 may be configured with a microapp action presentation engine 1102. As described above in connection with FIGS. 5B and 5C, the resource access application 522 may be executed on a client device 202 or may be executed on a Web server and accessed by a client device 202 via a browser. As also shown in FIG. 11, in some implementations, computing system 108b described in connection with FIG. 1D may be embodied by the resource management services 502. In particular, as illustrated, the resource management services 502 may be configured with a microapp action selection service 1104 and a microapp action configuration service 606 (which may be the same as the microapp action configuration service 606 described above in connection with FIG. 6). In some implementations, the microapp action configuration service 606 may perform the routine 900, as described above. As described above in connection with FIGS. 5B and 5C, the resource management services 502 may be executed on one or more servers 204, and may possibly be embodied within a cloud computing environment 512.

Figure 12:
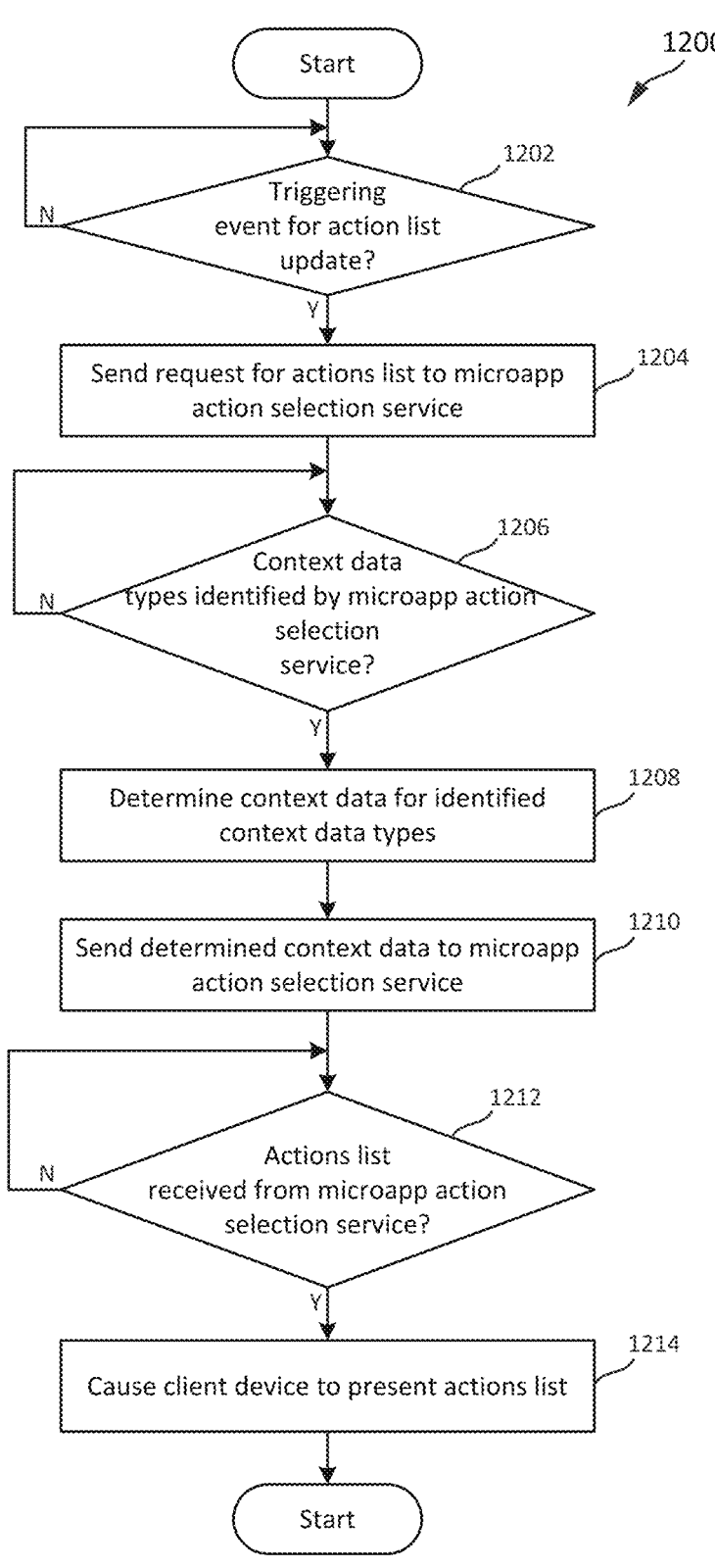
FIG. 12 shows an example routine that may be performed by the microapp action presentation engine shown in FIG. 11.

FIG. 12 shows an example routine 1200 that may be performed by the microapp action presentation engine 1102 shown in FIG. 11. In some implementations, the microapp action presentation engine 1102 may be embodied by one or more processors and one or more computer-readable media encoded with instructions which, when executed by the one or more processors, may cause a computing system (e.g., a client device 202 or a Web server executing the resource access application 522) to perform some of all of the indicated steps of the routine 1200. The example routine 1200 will be described in more detail below.

Figure 13:
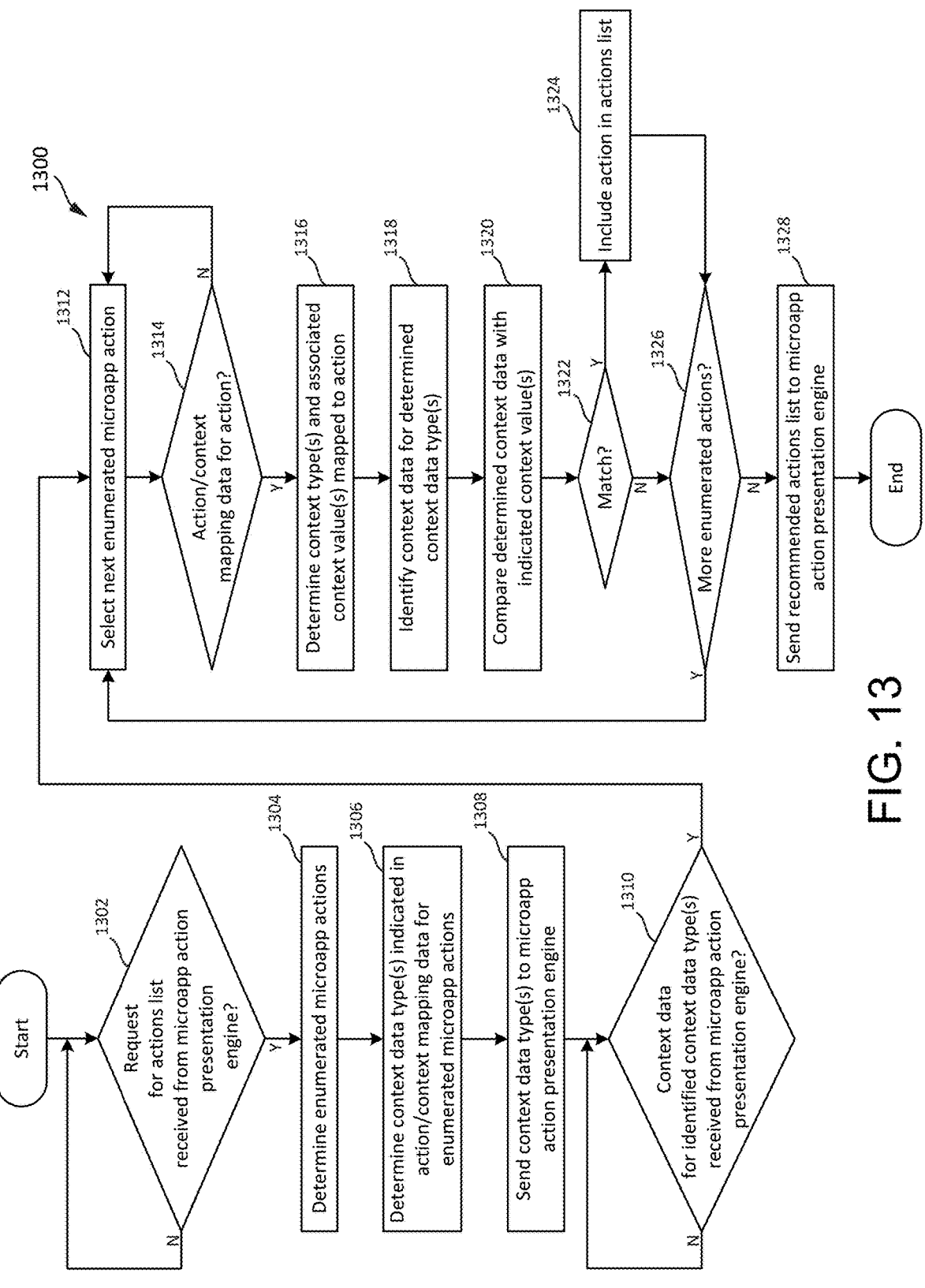
FIG. 13 shows an example routine that may be performed by the microapp action selection service shown in FIG. 11.

FIG. 13 shows an example routine 1300 that may be performed by the microapp action selection service 1104 shown in FIG. 11. In some implementations, the microapp action selection service 1104 may be embodied by one or more processors and one or more computer-readable media encoded with instructions which, when executed by the one or more processors, may cause a computing system (e.g., one or more servers 204) to perform some of all of the indicated steps of the routine 1300. The example routine 1300 will also be described in more detail below.

The routine 1200, which may be performed by the microapp action presentation engine 1102 shown in FIG. 11, will now be described. As shown in FIG. 12, at a decision step 1202, the microapp action presentation engine 1102 may determine whether a triggering event for updating the actions list 104 has occurred. In some implementations, such a triggering event may be a determination by the microapp action presentation engine 1102 that a contextual state of the client device 202 has changed in a way that might trigger a change to the microapp actions in the actions list 104. Additionally or alternatively, in some implementations, a triggering event may be a determination by the microapp action presentation engine 1102 that the user 524 has selected a user interface element requesting that the actions list 104 be presented and/or updated. Additionally or alternatively, in some implementations, such a triggering event may be the elapsing of a particular period of time. For instance, in some implementations, the microapp action presentation engine 1102 may determine that a triggering event per the decision step 1202 occurs once every minute, or at some other suitable interval.

In any event, when the microapp action presentation engine 1102 determines (at the decision step 1202) that such a triggering event has occurred, the routine 1200 may proceed to a step 1204, at which the microapp action presentation engine 1102 may send a request to the microapp action selection service 1104 for an actions list 104. The sending of such a request is indicated by an arrow 1106 in FIG. 11.

As described below in connection with FIG. 13, in response to receiving such a request, the microapp action selection service 1104 may determine one or more types of context data (relating to a contextual state of the client device 202) that are needed to determine whether to include certain microapp actions in the actions list 104 based on the current contextual state of the client device 202.

At a decision step 1206 of the routine 1200, the microapp action presentation engine 1102 may determine whether the microapp action selection service 1104 has, in response to the request sent at the step 1204, identified one or more types of context data that it needs to determine whether to include certain microapp actions in the actions list 104.

When, at the decision step 1206, the microapp action presentation engine 1102 determines that one or more types of context data have been identified by the microapp action selection service 1104, e.g., as indicated by an arrow 1108 in FIG. 11, the routine 1200 may proceed to a step 1208, at which the microapp action presentation engine 1102 may determine context data of the indicated types. Example of types of context data that may be determined by the microapp action presentation engine 1102, and techniques that may be used to acquire such context data, are described above in connection with FIG. 10.

At a step 1210 of the routine 1200, the microapp action presentation engine 1102 may send the context data determined at the step 1208 to the microapp action selection service 1104. Such sending of context data from the microapp action presentation engine 1102 to the microapp action selection service 1104 is indicated by an arrow 1110 in FIG. 11. As described below in connection with FIG. 13, in response to receiving the context data from the microapp action presentation engine 1102, the microapp action selection service 1104 may identify one or more microapp actions to include in the actions list 104 based on the current contextual state of the client device 202.

At a decision step 1212 of the routine 1200, the microapp action presentation engine 1102 may determine whether the microapp action selection service 1104 has, in response to the context data sent at the step 1210, identified one or more microapp actions that are to be included in the actions list 104.

When, at the decision step 1212, the microapp action presentation engine 1102 determines that one or more microapp actions for the actions list 104 have been identified by the microapp action selection service 1104, e.g., as indicated by an arrow 1112 in FIG. 11, the routine 1200 may proceed to a step 1214 at which the microapp action presentation engine 1102 may cause the client device 202 to present the actions list 104, e.g., as shown in FIG. 1A, including the microapp actions identified by the microapp action selection service 1104.

The routine 1300, which may be performed by the microapp action selection service 1104 shown in FIG. 11, will now be described. As shown in FIG. 13, at a decision step 1302 of the routine 1300, the microapp action selection service 1104 may determine whether a request for an actions list 104 has been received from the microapp action presentation engine 1102, e.g., per the step 1204 of the routine 1200 and as indicated by the arrow 1106 in FIG. 11.

When, at the decision step 1302, the microapp action selection service 1104 determines that a request for an actions list 104 has been received, the routine 1300 may proceed to a step 1304, at which the microapp action selection service 1104 may determine the types of microapp actions that have been enumerated or otherwise made available for use by the client device 202, e.g., based on profile data of a user 524 of the client device 202.

At a step 1306 of the routine 1300, the microapp action selection service 1104 may consult the action/context mapping data 128 for the user 524, e.g., stored in one or more databases within the resource management services 502, to determine the types of context data that are indicated for the enumerated microapp actions identified at the step 1304. In some embodiments, for example, such database(s) may store the action/context mapping data 128 in a table such as the table 1000 shown in FIG. 10, and the pertinent types of context data may be determined by identifying values of the "context type(s)" entries 136 in the table 1000 that correspond to the types of microapp actions that were determined at the step 1304 (e.g., as indicated by the "microapp action type" entries 134 in the table 1000).

At a step 1308 of the routine 1300, the microapp action selection service 1104 may send the determined context data types to the microapp action presentation engine 1102, e.g., as indicated by the arrow 1108 in FIG. 11.

At a decision step 1310 of the routine 1300, the microapp action selection service 1104 may determine whether context data of the identified types has been received from the microapp action presentation engine 1102, e.g., per the step 1210 of the routine 1200 and as indicated by the arrow 1110 in FIG. 11.

When, at the decision step 1310, the microapp action selection service 1104 determines that context data of the identified types has been received, the routine 1300 may proceed to a step 1312, at which the microapp action selection service 1104 may select one of the enumerated microapp actions identified at the step 1304 for evaluation.

Per the step 1312 and a decision step 1326, the microapp action selection service 1104 may cycle through the enumerated microapp actions identified at the step 1304, to determine whether those microapp actions are to be included in the actions list 104 based on a current contextual state of the client device 202. Although the routine 1300 indicates that the enumerated microapp actions are evaluated one at a time, it should be appreciated that, in practice, the evaluation of the enumerated microapp actions may instead proceed, in whole or in part, in parallel.

At a decision step 1314, the microapp action selection service 1104 may determine whether the action/context mapping data 128 for the user 524 includes any entries for the microapp action type selected at the step 1312. The example table 1000 (shown in FIG. 10) includes illustrative action/context mapping data 128 for the user 524. To perform the decision step 1314, the microapp action selection service 1104 may, for example, determine whether one or more of the "microapp action type" entries 134 in the table 1000 correspond to the microapp action type selected at the step 1312.

When, at the decision step 1314, the microapp action selection service 1104 determines that the action/context mapping data 128 for the user 524 includes at least one set of entries for the microapp action type selected at the step 1312, the routine 1300 may proceed to a step 1316, at which the microapp action selection service 1104 may determine the types of context data that are to be evaluated to determine whether to include the microapp action type selected at the step 1312 on the actions list 104, as well as the value(s) that contextual data needs to satisfy to trigger the inclusion of that microapp action on the list 104. With reference to the table 1000 (shown in FIG. 10), for example, for the respective "microapp action type" entries 134 that match the microapp action type selected at the step 1312, the microapp action selection service 1104 may determine the corresponding "context types(s)" entries 136 and "context value(s)" entries 138 in the table 1000.

At a step 1318 of the routine 1300, the microapp action selection service 1104 may identify, from among the context data was received from the microapp action presentation engine 1102 (per the decision step 1310), the context data for the context type(s) identified at the step 1316. As described in more detail below in connection with a step 1320, the microapp action selection service 1104 may compare the context data identified at the step 1318 with the context value(s) reflected in the action/context mapping data 128 for the indicated context data type(s), e.g., as "context value(s)" entries 138 in the table 1000. Numerous examples of sources of context data (e.g., as received per the decision step 1310), as well as circumstances in which such context data may be found to match one or more context values reflected in the action/context mapping data 128, are described above in connection with FIG. 10.

At a decision step 1322 of the routine 1300, the microapp action selection service 1104 may determine whether, for the microapp action type selected at the step 1312, the context data identified at the step 1318 matches the context value(s) in the action/context mapping data 128 for that microapp action type.

When, at the decision step 1322, the microapp action selection service 1104 determines that the context data identified at the step 1318 matches the corresponding context value(s) in the action/context mapping data 128, the routine 1300 may proceed to a step 1324, at which the microapp action selection service 1104 may include the microapp action under consideration in the actions list 104. When, on the other hand, the microapp action selection service 1104 determines (at the decision step 1322) that the context data identified at the step 1318 does not match the corresponding context value(s) in the action/context mapping data 128, the routine 1300 may instead proceed to the decision step 1326, at which the microapp action selection service 1104 may determine whether any of the enumerated microapp actions identified at the step 1304 remain to be evaluated.

When, at the decision step 1326, the microapp action selection service 1104 determines that there are additional microapp actions to be evaluated, the routine 1300 may return to the step 1312, at which the next enumerated microapp action may be selected for evaluation. When, on the other hand, the microapp action selection service 1104 determines that there are no additional microapp actions to be evaluated, the routine 1300 may instead proceed to a step 1328, at which the microapp action selection service 1104 may send the actions list 104, including the various microapp actions that were added to the list 104 per the step 1324, to the microapp action presentation engine 1102, where it may be presented on the client device 202 (e.g., as shown in FIG. 1A). Following the step 1328, the routine 1300 may terminate.

G. Example Implementations of Methods, Systems, and Computer-Readable Media in Accordance with the Present Disclosure The following paragraphs (M1) through (M13) describe examples of methods that may be implemented in accordance with the present disclosure.

(M1) A method may be performed that involves receiving, by an application associated with a client device and from a computing system, a plurality of indicators of actions that the computing system is configured to take with respect to systems of record in response to user input to the client device; determining first data indicative of a state of the client device; selecting, by the application and based at least in part on the first data, a subset of the plurality of indicators; and causing the client device to present one or more selectable user interface elements corresponding to the selected subset of the plurality of indicators such that selection of the one or more selectable user interface elements enables the client device to cause the computing system to take the indicated actions with respect to the systems of record.

(M2) A method may be performed as described in paragraph (M1), wherein the one or more selectable user interface elements may include a first selectable user interface element, the systems of record may include a first system of record, the actions may comprise a first action, and the method may further involve detecting selection of the first selectable user interface element; and causing the computing system to take the first action with respect to the first system of record based at least in part on selection of the first selectable user interface element.

(M3) A method may be performed as described in paragraph (M2), and may further involve, in response to selection of the first selectable user interface element, causing the client device present a user interface for a microapp for the first system of record, the user interface including at least a second selectable user interface element; detecting selection of the second selectable user interface element; and in response to selection of the second selectable user interface element, causing the microapp to take the first action with respect to the first system of record.

(M4) A method may be performed as described in any of paragraphs (M1) through (M3), and may further involve determining, by the application, that second data is associated a first indicator of the plurality of indicators, the first indicator corresponding to a first action that the computing system is configured to take with respect to a first system of record; determining, by the application, that the first data matches the second data; and determining to include the first indicator in the selected subset of the plurality of indicators based at least in part on the first data matching the second data.

(M5) A method may be performed as described in paragraph (M4), and may further involve determining, by the application, that third data is associated the first indicator; and determining to compare the first data with the second data based at least in part on the third data being associated with the first indicator.

(M6) A method may be performed as described in any of paragraphs (M1) through (M5), wherein the computing system may be configured to execute microapps for the systems of record, and may be further configured to take the actions with respect to the systems of record via application programming interface (API) calls that are based on user interaction with the microapps.

(M7) A method may be performed as described in any of paragraphs (M1) through (M6), wherein determining the first data may comprise at least one of (A) determining a type of application window that is being presented via the client device, (B) determining a location of the client device, (C) determining text being presented via the client device, or (D) determining an identifier of at least one device proximate to the client device.

(M8) A method may be performed that involves determining a plurality of indicators of actions that a computing system is configured to take with respect to systems of record in response to user input to a client device; determining that first data is associated a first indicator of the plurality of indicators, the first indicator corresponding to a first action that the computing system is configured to take with respect to a first system of record; determining second data indicative of a contextual state of the client device; determining that the second data matches the first data; and causing, based at least in part on the second data matching the first data, the client device to present a first selectable user interface element corresponding to the first indicator such that selection of the first selectable user interface element enables the client device to cause the computing system to take the first action with respect to the first system of record.

(M9) A method may be performed as described in paragraph (M8), wherein the method may be executed by a client device.

(M10) A method may be performed as described in paragraph (M8), wherein the method may be executed by the computing system.

(M11) A method may be performed as described in any of paragraphs (M8) through (M10), and may further involve detecting selection of the first selectable user interface element; and causing the computing system to take the first action with respect to the first system of record based at least in part on selection of the first selectable user interface element.

(M12) A method may be performed as described in paragraph (M11), and may further involve, in response to selection of the first selectable user interface element, causing the client device present a user interface for a microapp for the first system of record, the user interface including at least a second selectable user interface element; detecting selection of the second selectable user interface element; and in response to selection of the second selectable user interface element, causing the microapp to take the first action with respect to the first system of record.

(M13) A method may be performed as described in any of paragraphs (M8) through (M12), and may further involve determining that third data is associated the first indicator; and determining to compare the first data with the second data based at least in part on the third data being associated with the first indicator.

The following paragraphs (S1) through (S13) describe examples of systems and devices that may be implemented in accordance with the present disclosure.

(S1) A system may comprise at least one processor, and at least one computer-readable medium encoded with instructions which, when executed by the at least one processor, cause the system to receive, by an application associated with a client device and from a computing system, a plurality of indicators of actions that the computing system is configured to take with respect to systems of record in response to user input to the client device, to determine first data indicative of a state of the client device, to select, by the application and based at least in part on the first data, a subset of the plurality of indicators, and to cause the client device to present one or more selectable user interface elements corresponding to the selected subset of the plurality of indicators such that selection of the one or more selectable user interface elements enables the client device to cause the computing system to take the indicated actions with respect to the systems of record.

(S2) A system may be configured as described in paragraph (S1), wherein the one or more selectable user interface elements may include a first selectable user interface element, the systems of record may include a first system of record, the actions may comprise a first action, and the at least one computer-readable medium may be further encoded with additional instructions which, when executed by the at least one processor, further cause the system to detect selection of the first selectable user interface element, and to cause the computing system to take the first action with respect to the first system of record based at least in part on selection of the first selectable user interface element.

(S3) A system may be configured as described in paragraph (S2), and the at least one computer-readable medium may be further encoded with additional instructions which, when executed by the at least one processor, further cause the system to, in response to selection of the first selectable user interface element, cause the client device present a user interface for a microapp for the first system of record, the user interface including at least a second selectable user interface element, to detect selection of the second selectable user interface element, and to, in response to selection of the second selectable user interface element, cause the microapp to take the first action with respect to the first system of record.

(S4) A system may be configured as described in any of paragraphs (S1) through (S3), and the at least one computer-readable medium may be further encoded with additional instructions which, when executed by the at least one processor, further cause the system to determine, by the application, that second data is associated a first indicator of the plurality of indicators, the first indicator corresponding to a first action that the computing system is configured to take with respect to a first system of record, to determine, by the application, that the first data matches the second data, and to determine to include the first indicator in the selected subset of the plurality of indicators based at least in part on the first data matching the second data.

(S5) A system may be configured as described in paragraph (S4), and the at least one computer-readable medium may be further encoded with additional instructions which, when executed by the at least one processor, further cause the system to determine, by the application, that third data is associated the first indicator, and to determine to compare the first data with the second data based at least in part on the third data being associated with the first indicator.

(S6) A system may be configured as described in any of paragraphs (S1) through (S5), wherein the computing system may be configured to execute microapps for the systems of record, and may be further configured to take the actions with respect to the systems of record via application programming interface (API) calls that are based on user interaction with the microapps.

(S7) A system may be configured as described in any of paragraphs (S1) through (S6), wherein the at least one computer-readable medium may be further encoded with additional instructions which, when executed by the at least one processor, further cause the system to determine the first data at least in part by doing one of (A) determining a type of application window that is being presented via the client device, (B) determining a location of the client device, (C) determining text being presented via the client device, or (D) determining an identifier of at least one device proximate to the client device.

(S8) A system may comprise at least one processor, and at least one computer-readable medium encoded with instructions which, when executed by the at least one processor, cause the system to determine a plurality of indicators of actions that a computing system is configured to take with respect to systems of record in response to user input to a client device, to determine that first data is associated a first indicator of the plurality of indicators, the first indicator corresponding to a first action that the computing system is configured to take with respect to a first system of record, to determine second data indicative of a contextual state of the client device, to determine that the second data matches the first data, and to, based at least in part on the second data matching the first data, cause the client device to present a first selectable user interface element corresponding to the first indicator such that selection of the first selectable user interface element enables the client device to cause the computing system to take the first action with respect to the first system of record.

(S9) A system may be configured as described in paragraph (S8), wherein the at least one processor and the at least one computer-readable medium may be included within a client device.

(S10) A system may be configured as described in paragraph (S8), wherein the at least one processor and the at least one computer-readable medium may be included within the computing system.

(S11) A system may be configured as described in any of paragraphs (S8) through (S10), wherein the at least one computer-readable medium may be further encoded with additional instructions which, when executed by the at least one processor, further cause the system to detect selection of the first selectable user interface element, and to cause the computing system to take the first action with respect to the first system of record based at least in part on selection of the first selectable user interface element.

(S12) A system may be configured as described in paragraph (S11), wherein the at least one computer-readable medium may be further encoded with additional instructions which, when executed by the at least one processor, further cause the system to, in response to selection of the first selectable user interface element, cause the client device present a user interface for a microapp for the first system of record, the user interface including at least a second selectable user interface element, to detect selection of the second selectable user interface element, and to, in response to selection of the second selectable user interface element, cause the microapp to take the first action with respect to the first system of record.

(S13) A system may be configured as described in any of paragraphs (S8) through (S12), wherein the at least one computer-readable medium may be further encoded with additional instructions which, when executed by the at least one processor, further cause the system to determine that third data is associated the first indicator, and to determine to compare the first data with the second data based at least in part on the third data being associated with the first indicator.

The following paragraphs (CRM1) through (CRM13) describe examples of computer-readable media that may be implemented in accordance with the present disclosure.

(CRM1) At least one non-transitory, computer-readable medium may be encoded with instructions which, when executed by at least one processor included in a system, cause the system to receive, by an application associated with a client device and from a computing system, a plurality of indicators of actions that the computing system is configured to take with respect to systems of record in response to user input to the client device, to determine first data indicative of a state of the client device, to select, by the application and based at least in part on the first data, a subset of the plurality of indicators, and to cause the client device to present one or more selectable user interface elements corresponding to the selected subset of the plurality of indicators such that selection of the one or more selectable user interface elements enables the client device to cause the computing system to take the indicated actions with respect to the systems of record.

(CRM2) At least one non-transitory, computer-readable medium may be configured as described in paragraph (CRM1), wherein the one or more selectable user interface elements may include a first selectable user interface element, the systems of record may include a first system of record, the actions may comprise a first action, and the at least one computer-readable medium may be further encoded with additional instructions which, when executed by the at least one processor, further cause the system to detect selection of the first selectable user interface element, and to cause the computing system to take the first action with respect to the first system of record based at least in part on selection of the first selectable user interface element.

(CRM3) At least one non-transitory, computer-readable medium may be configured as described in paragraph (CRM2), and may be further encoded with additional instructions which, when executed by the at least one processor, further cause the system to, in response to selection of the first selectable user interface element, cause the client device present a user interface for a microapp for the first system of record, the user interface including at least a second selectable user interface element, to detect selection of the second selectable user interface element, and to, in response to selection of the second selectable user interface element, cause the microapp to take the first action with respect to the first system of record.

(CRM4) At least one non-transitory, computer-readable medium may be configured as described in any of paragraphs (CRM1) through (CRM3), and may be further encoded with additional instructions which, when executed by the at least one processor, further cause the system to determine, by the application, that second data is associated a first indicator of the plurality of indicators, the first indicator corresponding to a first action that the computing system is configured to take with respect to a first system of record, to determine, by the application, that the first data matches the second data, and to determine to include the first indicator in the selected subset of the plurality of indicators based at least in part on the first data matching the second data.

(CRM5) At least one non-transitory, computer-readable medium may be configured as described in paragraph (CRM4), and may be further encoded with additional instructions which, when executed by the at least one processor, further cause the system to determine, by the application, that third data is associated the first indicator, and to determine to compare the first data with the second data based at least in part on the third data being associated with the first indicator.

(CRM6) At least one non-transitory, computer-readable medium may be configured as described in any of paragraphs (CRM1) through (CRM5), wherein the computing system may be configured to execute microapps for the systems of record, and may be further configured to take the actions with respect to the systems of record via application programming interface (API) calls that are based on user interaction with the microapps.

(CRM7) At least one non-transitory, computer-readable medium may be configured as described in any of paragraphs (CRM1) through (CRM6), and may be further encoded with additional instructions which, when executed by the at least one processor, further cause the system to determine the first data at least in part by doing one of (A) determining a type of application window that is being presented via the client device, (B) determining a location of the client device, (C) determining text being presented via the client device, or (D) determining an identifier of at least one device proximate to the client device.

(CRM8) At least one non-transitory, computer-readable medium may be encoded with instructions which, when executed by at least one processor included in a system, cause the system to determine a plurality of indicators of actions that a computing system is configured to take with respect to systems of record in response to user input to a client device, to determine that first data is associated a first indicator of the plurality of indicators, the first indicator corresponding to a first action that the computing system is configured to take with respect to a first system of record, to determine second data indicative of a contextual state of the client device, to determine that the second data matches the first data, and to, based at least in part on the second data matching the first data, cause the client device to present a first selectable user interface element corresponding to the first indicator such that selection of the first selectable user interface element enables the client device to cause the computing system to take the first action with respect to first system of record.

(CRM9) At least one non-transitory, computer-readable medium may be configured as described in paragraph (CRM8), wherein the at least one computer-readable medium may be included within a client device.

(CRM10) At least one non-transitory, computer-readable medium may be configured as described in paragraph (CRM8), wherein the at least one computer-readable medium may be included within the computing system.

(CRM11) At least one non-transitory, computer-readable medium may be configured as described in any of paragraphs (CRM8) through (CRM10), and may be further encoded with additional instructions which, when executed by the at least one processor, further cause the system to detect selection of the first selectable user interface element, and to cause the computing system to take the first action with respect to the first system of record based at least in part on selection of the first selectable user interface element.

(CRM12) At least one non-transitory, computer-readable medium may be configured as described in paragraph (CRM11), and may be further encoded with additional instructions which, when executed by the at least one processor, further cause the system to, in response to selection of the first selectable user interface element, cause the client device present a user interface for a microapp for the first system of record, the user interface including at least a second selectable user interface element, to detect selection of the second selectable user interface element, and to, in response to selection of the second selectable user interface element, cause the microapp to take the first action with respect to the first system of record.

(CRM13) At least one non-transitory, computer-readable medium may be configured as described in any of paragraphs (CRM8) through (CRM12), and may be further encoded with additional instructions which, when executed by the at least one processor, further cause the system to determine that third data is associated the first indicator, and to determine to compare the first data with the second data based at least in part on the third data being associated with the first indicator.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

receiving, by an application associated with a client device and from a computing system, a plurality of indicators of microapp actions that the computing system is configured to take with respect to systems of record (SOR), wherein each indicator comprises a mapping of a context to one or more microapp actions to be taken;

determining first data indicative of a state of the client device, wherein the state comprises information for a plurality of active applications on the client device;

selecting, by the application and based at least in part on the first data, a subset of the plurality of indicators by comparing the first data to the plurality of indicators of microapp actions;

causing the client device to present one or more selectable user interface elements corresponding to the selected subset of the plurality of indicators, each of the one or more selectable user interface elements is associated with a respective microapp action, each microapp action associated with one or more microapps including a first microapp and configured to provide at least one service of the corresponding one or more microapps, wherein the first microapp is configured to provide the at least one service of the microapps;

detecting selection of a user interface element of the one or more selectable user interface elements, the user interface element being associated with the first microapp; and in response to detecting the selection, sending an instruction from the client device to the computing system that causes the computing system to execute the first microapp to take respective microapp action on a corresponding SOR, wherein receiving an instruction to update the plurality of indicators of actions that the computing system is configured to take with respect to SOR is in response to at least one of:

a determination that a user has been provided with access to a new SOR, a system administrator actively updating the plurality of indicators of actions, or in response to a new microapp action becoming available for a SOR that was previously available to the user.

2. The method of claim 1, wherein the computing system is configured to execute the microapps for the SOR, and is further configured to take actions with respect to the SOR via application programming interface (API) calls that are based on user interaction with the microapps.

3. The method of claim 1, wherein determining the first data comprises at least one of (A) determining a type of application window that is being presented via the client device, (B) determining a location of the client device, (C) determining text being presented via the client device, or (D) determining an identifier of at least one device proximate to the client device.

4. The method of claim 1, wherein the indicated actions are performed without launching an associated application.

5. A method, comprising:

determining a plurality of indicators of microapp actions that a computing system is configured to take with respect to systems of record (SOR), wherein each indicator comprises a mapping of a context to one or more microapp actions to be taken;

determining that first data is associated with a first indicator of the plurality of indicators, the first indicator corresponding to a first microapp action that the computing system is configured to take with respect to the SOR;

determining second data indicative of a contextual state of a client device, wherein the state comprises information for a plurality of active applications on the client device;

determining that the second data matches the first data to select a subset of the plurality of indicators; and causing the client device to present one or more selectable user interface elements corresponding to the selected subset of the plurality of indicators, each of the one or more selectable user interface elements is associated with a respective microapp action, each microapp action associated with one or more microapps including a first microapp and configured to provide at least one service of the corresponding one or more microapps, wherein the first microapp is configured to provide the at least one service of the microapps;

detecting selection of a user interface element of the one or more selectable user interface elements, the user interface element being associated with the first microapp; and in response to detecting the selection, sending an instruction from the client device to the computing system that causes the computing system to execute the first microapp to take respective microapp action on a corresponding SOR, wherein receiving an instruction to update the plurality of indicators of actions that the computing system is configured to take with respect to SOR is in response to at least one of:

a determination that a user has been provided with access to a new SOR, a system administrator actively updating the plurality of indicators of actions, or in response to a new microapp action becoming available for a SOR that was previously available to the user.

6. The method of claim 1, wherein each indicator comprises a context type, a context value, and an action type, wherein each context type identifies one or more types of contextual data, and each context value identifies a predefined condition value, and wherein selecting the subset of the plurality of indicators comprises selecting those indicators whose corresponding context type and context value match the first data.

7. The method of claim 1, wherein receiving the plurality of indicators of actions that the computing system is configured to take with respect to systems of record SOR is in response to a triggering event occurring, wherein a triggering event comprises at least one of:

context of a user device changing, a user selection requesting the one or more selectable user interface elements be presented or updated, or a predetermined amount of time elapsing.

8. The method of claim 1, wherein receiving the plurality of indicators of actions that the computing system is configured to take with respect to SOR is in response to, a determination that a request for a microapp actions list from a microapp action presentation engine has been received.

9. The method of claim 1, wherein the plurality of indicators of actions that the computing system is configured to take with respect to SOR is comprised of:

enumerated types of microapp actions for use by the client device based on profile data of a user by a microapp selection service; and types of context data that are indicated for the enumerated types of microapp actions for use by the client device, wherein each type of context data is identified by a database containing microapp action/context mapping data for a user.

10. The method of claim 1, wherein the selecting is in response to, the plurality of indicators of actions containing types of context data indicated for enumerated types of microapp actions for use by the client device being received.

11. A system, comprising:

at least one processor; and at least one computer-readable medium encoded with instructions which, when executed by the at least one processor, cause the system to:

receive, by an application associated with a client device and from a computing system, a plurality of indicators of microapp actions that the computing system is configured to take with respect to systems of record (SOR), wherein each indicator comprises a mapping of a context to one or more microapp actions to be taken;

determine first data indicative of a state of the client device, wherein the state comprises information from a plurality of active applications on the client device;

select, by the application and based at least in part on the first data, a subset of the plurality of indicators by comparing the first data to the plurality of indicators of microapp actions;

cause the client device to present one or more selectable user interface elements corresponding to the selected subset of the plurality of indicators, each of the one or more selectable user interface elements associated with a respective microapp action, each microapp action associated with one or more microapps including a first microapp and configured to provide at least one service of the corresponding one or more microapps, wherein the first microapp is configured to provide the at least one service microapps without launching an associated application;

detect selection of a user interface element of the one or more selectable user interface elements, the user interface element being associated with the first microapp; and in response to detecting the selection, sending an instruction from the client device to the computing system that causes the computing system to execute the first microapp to take respective microapp action on a corresponding SOR, wherein receiving an instruction to update the plurality of indicators of actions that the computing system is configured to take with respect to SOR is in response to at least one of:

a determination that a user has been provided with access to a new SOR, a system administrator actively updating the plurality of indicators of actions, or in response to a new microapp action becoming available for a SOR that was previously available to the user.

12. The system of claim 11, wherein the computing system is configured to execute the microapps for the SOR, and is further configured to take actions with respect to the SOR via application programming interface (API) calls that are based on user interaction with the microapps.

13. The system of claim 11, wherein the at least one computer-readable medium is further encoded with additional instructions which, when executed by the at least one processor, further cause the system to:

determine the first data at least on part by determining at least one of (A) a type of application window that is being presented via the client device, (B) a location of the client device, (C) text being presented via the client device, or (D) an identifier of at least one device proximate to the client device.

14. The method of claim 5, wherein the indicated actions are performed without launching an associated application.

15. The method of claim 5, wherein the method is executed by the client device.

16. The method of claim 5, wherein the method is executed by the computing system.

17. The method of claim 5, further comprising:

determining that third data is associated with the first indicator; and comparing the first data with the second data based at least in part on the third data being associated with the first indicator.

* * * * *